(12) United States Patent
Raimondo

(10) Patent No.: US 12,259,912 B2
(45) Date of Patent: Mar. 25, 2025

(54) METHOD AND SYSTEM FOR INTERACTIVE SEARCHING BASED ON SEMANTIC SIMILARITY OF SEMANTIC REPRESENTATIONS OF TEXT OBJECTS

(71) Applicant: SERVICENOW CANADA INC., Montréal (CA)

(72) Inventor: Stefania Raimondo, Montreál (CA)

(73) Assignee: SERVICENOW CANADA INC., Montréal (CA)

(*) Notice: Subject to any disclaimer, the term of this patent is extended or adjusted under 35 U.S.C. 154(b) by 900 days.

(21) Appl. No.: 17/304,616

(22) Filed: Jun. 23, 2021

(65) Prior Publication Data

US 2022/0414128 A1  Dec. 29, 2022

(51) Int. Cl.
| | |
|---|---|
| G06F 16/33 | (2019.01) |
| G06F 16/332 | (2019.01) |
| G06F 16/334 | (2025.01) |
| G06F 40/30 | (2020.01) |
| G06N 20/00 | (2019.01) |

(52) U.S. Cl.
CPC ...... *G06F 16/3326* (2019.01); *G06F 16/3344* (2019.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,459,962 B1 | 10/2019 | Jayaraman | |
| 2009/0157611 A1* | 6/2009 | Kipersztok | G06F 16/3338 707/E17.061 |
| 2015/0120738 A1* | 4/2015 | Srinivasan | G06F 16/285 707/739 |
| 2015/0293976 A1 | 10/2015 | Guo | |
| 2017/0124447 A1 | 5/2017 | Chang | |
| 2018/0373699 A1 | 12/2018 | McAteer | |

(Continued)

FOREIGN PATENT DOCUMENTS

| | | |
|---|---|---|
| GB | 2594129 A | 10/2021 |
| WO | 2019140863 A1 | 7/2019 |
| WO | 2020079752 A1 | 4/2020 |

*Primary Examiner* — Nafiz E Hoque
(74) *Attorney, Agent, or Firm* — Fasken Martineau DuMoulin LLP; Johann Gest

(57) ABSTRACT

There is provided a method and a system for generating an interactive search interface in response to a search request by using at least one machine learning (ML) model. A search request such as one of a word, a sentence, a paragraph, and a document is received, and a semantic representation of the search request is received. Semantically similar documents are received by: comparing the search request semantic representation with document representations to obtain semantic similarity scores, and selecting semantically similar documents based on the scores. For each of the set of semantically similar documents, a respective set of similar paragraphs, sentences, and words are determined based on associated representations. An interactive search interface is generated and displayed to a user interface. A selection of a given document is received, and each of the respective set of similar paragraphs, sentences, and similar words associated with the given document are displayed.

20 Claims, 10 Drawing Sheets

(56) References Cited

U.S. PATENT DOCUMENTS

2019/0042551 A1  2/2019  Hwang
2020/0302018 A1  9/2020  Turkkan
2021/0319068 A1* 10/2021  Li ........................ G06N 3/006

* cited by examiner

1000

```
┌─────────────────────────────────────────────────────────┐
│ receiving a search request, the search request          │─1002
│ comprising an indication of a text object               │
└─────────────────────────────────────────────────────────┘
                            ↓
┌─────────────────────────────────────────────────────────┐
│ receiving, based on the indication, a semantic          │─1004
│ representation of the search request                    │
└─────────────────────────────────────────────────────────┘
                            ↓
┌─────────────────────────────────────────────────────────┐
│ receiving a set of semantically similar documents,      │─1006
│ said receiving comprising:                              │
└─────────────────────────────────────────────────────────┘
                            ↓
┌─────────────────────────────────────────────────────────┐
│ comparing, using at least one ML model, the semantic    │
│ representation of the search request with each of a     │─1008
│ plurality of document representations from the database │
│ to obtain respective semantic similarity scores         │
└─────────────────────────────────────────────────────────┘
                            ↓
┌─────────────────────────────────────────────────────────┐
│ selecting, based on the respective semantic similarity  │
│ scores, the set of semantically similar documents from  │─1010
│ the plurality of documents                              │
└─────────────────────────────────────────────────────────┘
                            ↓
┌─────────────────────────────────────────────────────────┐
│ determining, using the at least one ML model, for each  │
│ of the set of semantically similar documents: a set of  │─1012
│ similar paragraphs, set a set of similar sentences, and │
│ a set of similar words based on associated              │
│ representations thereof                                 │
└─────────────────────────────────────────────────────────┘
                            ↓
┌─────────────────────────────────────────────────────────┐
│ generating an interactive semantic search interface     │─1014
│ comprising the set of semantically similar documents    │
└─────────────────────────────────────────────────────────┘
                            ↓
┌─────────────────────────────────────────────────────────┐
│ receiving a selection of a given document               │─1016
└─────────────────────────────────────────────────────────┘
                            ↓
┌─────────────────────────────────────────────────────────┐
│ generating, for display on the interactive semantic     │
│ search interface, the set of similar paragraphs, the    │─1020
│ set of similar sentences, and the set of similar        │
│ keywords associated with the given document             │
└─────────────────────────────────────────────────────────┘
```

Figure 10

METHOD AND SYSTEM FOR INTERACTIVE SEARCHING BASED ON SEMANTIC SIMILARITY OF SEMANTIC REPRESENTATIONS OF TEXT OBJECTS

CROSS-REFERENCE TO RELATED APPLICATIONS

None.

FIELD

The present technology relates to machine learning (ML) and natural language processing (NLP) in general, and more specifically to methods and systems for performing interactive searches in a multi-level exploration context based on semantic similarity of text objects such as documents, paragraphs, sentences and words which is determined based on semantic representations thereof.

BACKGROUND

Search engines typically enable users to search for textual content in databases or structured data format by using different information retrieval techniques in combination with machine learning models to determine which information would be the most relevant to the user. Generally speaking, a user has access to a search interface and submits a search query or search request with the information he or she wants to find or know more about, which may be located in a database or the Internet for example. The search engine uses different algorithms to retrieve results associated with the search request, rank the search results, and present the ranked results in the form of a search engine results page (SERP) for example. Such search engines typically use an index containing keywords associated with websites or documents, which are then matched literally with the search request and ranked.

However, in some instances, typical search engine systems may not necessarily provide any interpretation of the results, may not enable the user to understand why or how the search results have been considered to be relevant to a query, and may not take into account the meaning of the search query with respect to the provided search results.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

Developer(s) of the present technology have appreciated that existing search solution generally return documents that are deemed most "relevant" to an input query, but do not necessarily provide other types of connections, for example by returning the most similar sentences in response to an input document, the most similar documents in response to an input document, the most similar documents in response to an input keyword, etc.

More specifically, developers have appreciated that natural language processing (NLP) techniques could be used to generate semantic representations of objects such as words, sentences, paragraphs and documents, and the semantic representations could be compared to determine a similarity score indicative of a level of semantic similarity between a given text object and another given text object, where the given text object and the other given text object may be of different types or levels (e.g. word-sentence, word-paragraph, paragraph-document, document-sentence, etc.).

Thus, developers have appreciated that it would be possible to return any type of chosen text object in response to an input search text object, while also taking into account its meaning and similarity at different levels. Developer(s) have contemplated that a multi-level and exploratory interface comprising the text objects could be provided, which could enable users to view similarities not just at the document level, but also at the paragraph and sentence level. The interactive interface could enable user(s) to further explore higher level similarities by digging into the lower lever similarities that contributed to the associations (e.g. from document level to paragraph level). The interactive interface could also enable users to perform flexible comparisons between various "starting points" and filter their search results based on both fixed (known) and calculated attributes (e.g. filter based on a known keyword (fixed), or filter documents most similar to a given document (calculated)).

Thus, one or more embodiments of the present technology are directed to a method of and system for interactive searching based on semantic similarity of semantic representations of text objects In accordance with a broad aspect of the present technology, there is provided a method for generating an interactive search interface in response to a search request. The method is executed by a processor, the processor is connected to a database, and the processor has access to at least one machine learning (ML) model having been trained to generate and compare semantic representations of text objects. The method comprises: receiving the search request, the search request comprising an indication of a text object, the text object comprising one of: a word, a sentence, a paragraph, and a document, receiving, based on the indication of the text object, a semantic representation of the search request, receiving, from the database, a set of semantically similar documents. Said receiving the set of semantically similar documents comprises: comparing, using the at least one ML model, the semantic representation of the search request with each of a plurality of document representations to obtain a plurality of semantic similarity scores, each semantic similarity score being indicative of a semantic similarity between the search request and a respective document of a plurality of documents in the database, and selecting, based on the plurality of semantic similarity scores, the set of semantically similar documents from the plurality of documents, determining, using the at least one ML model, for each of the set of semantically similar documents, a respective set of similar paragraphs based on associated paragraph representations thereof, a respective set of similar sentences based on associated sentence representations thereof, and a respective set of similar words based on associated word representations thereof. The method comprises: generating, for display on a display interface operatively connected to the processor, the interactive search interface comprises the set of semantically similar documents, receiving a selection of a given document of the set of semantically similar documents, and generating, for display on the interactive search interface, an indication of each of the respective set of similar paragraphs, the respective set of similar sentences, and the respective set of similar words associated with the given document.

In one or more embodiments of the method, said generating the interactive search interface comprises the set of semantically similar documents comprises: generating a respective detailed view for each of the set of semantically similar documents, the detailed view comprises at least a portion of each of: the respective set of similar paragraphs, the respective set of similar sentences, and the respective set of similar words.

In one or more embodiments of the method, said generating for display on the interactive search interface, the indication of each of the given document, the respective set of similar paragraphs, the respective set of similar sentences, and the respective set of similar words associated with the given document comprises: generating, on the interactive search interface, a visual indication of each of the respective set of similar paragraphs, the respective set of similar sentences, and the respective set of similar words associated with the given document.

In one or more embodiments of the method, said receiving, based on the indication, the semantic representation of the search request comprises generating, using the at least one ML model, the semantic representation of the search request.

In one or more embodiments of the method, said determining, using the at least one ML model, for each of the set of documents, the respective set of similar paragraphs, the respective set of similar sentences, and the respective set of similar words associated with the given document is performed after said generating, for display on the interactive search interface, the set of semantically similar documents.

In one or more embodiments of the method, each document is associated with respective metadata, and said comparing comprises comparing the respective metadata with the search request.

In one or more embodiments of the method, the database comprises, for each of the set of documents: the associated paragraph representations, the associated sentence representations, and the associated word representations.

In one or more embodiments of the method, the method further comprises prior to said determining, using the at least one ML model, for each of the set of semantically similar documents, the respective set of similar paragraphs, the respective set of similar sentences, and the respective set of similar words: generating, for each document of the set of semantically similar documents, the respective paragraph presentations, the respective sentence representations and the respective word representations, and comparing, each document representation of the set of semantically similar documents with each of the respective paragraph presentations, the respective sentence representations and the respective word representations.

In one or more embodiments of the method, said determining, using the at least one ML model for each of the set of semantically similar documents, the respective set of similar paragraphs, the respective set of similar sentences, and the respective set of similar words is performed during said comparing the semantic representation of the search request with the plurality of document representations.

In one or more embodiments of the method, said determining, using the at least one ML model, based on the semantic representation of the search request, for each of the set of documents, the respective set of similar paragraphs, the respective set of similar sentences, and the respective set of similar words comprises: comparing the semantic representation of the search request with each of the associated word representation in the given document to obtain a respective word semantic similarity score, comparing the semantic representation of the search request with each of the associated sentence representation in the given document to obtain a respective sentence semantic similarity score, comparing the semantic representation of the search request with each of the associated paragraph representation in the given document to obtain a respective paragraph semantic similarity score, said determining the respective set of similar paragraphs, the respective set of similar sentences, and the respective set of similar words is based on the respective paragraph semantic similarity score, the respective sentence semantic similarity score and the respective word semantic similarity score.

In one or more embodiments of the method, said selecting, based on the respective similarity scores, the set of semantically similar documents from the plurality of documents is based on the respective semantic similarity scores being above a threshold.

In one or more embodiments of the method, the method further comprises prior to said selecting, based on the respective similarity scores, the set of semantically similar documents from the plurality of documents: determining, based on a number of the plurality of documents and the respective semantic similarity scores, the threshold.

In accordance with a broad aspect of the present technology, there is provided a system for generating an interactive search interface in response to a search request. The system comprises: a processor, and a non-transitory storage medium operatively connected to the processor, the non-transitory storage medium comprises instructions. The processor has access to at least one machine learning (ML) model having been trained to generate and compare semantic representations of text objects. The processor, upon executing the instructions, is configured for: receiving the search request, the search request comprises an indication of a text object, the text object comprises one of: a word, a sentence, a paragraph, and a document, receiving, based on the indication of the text object, a semantic representation of the search request, receiving, from the non-transitory storage medium, a set of semantically similar documents, said receiving the set of semantically similar documents comprises: comparing, using the at least one ML model, the semantic representation of the search request with each of a plurality of document representations to obtain a plurality of semantic similarity scores, each semantic similarity score being indicative of a semantic similarity between the search request and a respective document of a plurality of documents in the non-transitory storage medium, and selecting, based on the plurality of semantic similarity scores, the set of semantically similar documents from the plurality of documents, determining, using the at least one ML model, for each of the set of semantically similar documents, a respective set of similar paragraphs based on associated paragraph representations thereof, a respective set of similar sentences based on associated sentence representations thereof, and a respective set of similar words based on associated word representations thereof, generating, for display on a display interface operatively connected to the processor, the interactive search interface comprises the set of semantically similar documents, receiving a selection of a given document of the set of semantically similar documents, and generating, for display on the interactive search interface, an indication of each of the respective set of similar paragraphs, the respective set of similar sentences, and the respective set of similar words associated with the given document.

In one or more embodiments of the system, said generating the interactive search interface comprises the set of semantically similar documents comprises: generating a respective detailed view for each of the set of semantically similar documents, the detailed view comprises at least a portion of each of: the respective set of similar paragraphs, the respective set of similar sentences, and the respective set of similar words.

In one or more embodiments of the system, said generating for display on the interactive search interface, the indication of each of the given document, the respective set of similar paragraphs, the respective set of similar sentences, and the respective set of similar words associated with the given document comprises: generating, on the interactive search interface, a visual indication of each of the respective set of similar paragraphs, the respective set of similar sentences, and the respective set of similar words associated with the given document.

In one or more embodiments of the system, said receiving, based on the indication, the semantic representation of the search request comprises generating, using the at least one ML model, the semantic representation of the search request.

In one or more embodiments of the system, said determining, using the at least one ML model, for each of the set of documents, the respective set of similar paragraphs, the respective set of similar sentences, and the respective set of similar words associated with the given document is performed after said generating, for display on the interactive search interface, the set of semantically similar documents.

In one or more embodiments of the system, each document is associated with respective metadata, and said comparing comprises comparing the respective metadata with the search request.

In one or more embodiments of the system, the non-transitory storage medium stores for each of the set of documents: the associated paragraph representations, the associated sentence representations, and the associated word representations.

In one or more embodiments of the system, the processor is further configured for, prior to said determining, using the at least one ML model, for each of the set of semantically similar documents, the respective set of similar paragraphs, the respective set of similar sentences, and the respective set of similar words: generating, for each document of the set of semantically similar documents, the respective paragraph presentations, the respective sentence representations and the respective word representations, and comparing, each document representation of the set of semantically similar documents with each of the respective paragraph presentations, the respective sentence representations and the respective word representations.

In one or more embodiments of the system, said determining, using the at least one ML model for each of the set of semantically similar documents, the respective set of similar paragraphs, the respective set of similar sentences, and the respective set of similar words is performed during said comparing the semantic representation of the search request with the plurality of document representations.

In one or more embodiments of the system, said determining, using the at least one ML model, based on the semantic representation of the search request, for each of the set of documents, the respective set of similar paragraphs, the respective set of similar sentences, and the respective set of similar words comprises: comparing the semantic representation of the search request with each of the associated word representation in the given document to obtain a respective word semantic similarity score, comparing the semantic representation of the search request with each of the associated sentence representation in the given document to obtain a respective sentence semantic similarity score, comparing the semantic representation of the search request with each of the associated paragraph representation in the given document to obtain a respective paragraph semantic similarity score, said determining the respective set of similar paragraphs, the respective set of similar sentences, and the respective set of similar words is based on the respective paragraph semantic similarity score, the respective sentence semantic similarity score and the respective word semantic similarity score.

In one or more embodiments of the system, said selecting, based on the respective similarity scores, the set of semantically similar documents from the plurality of documents is based on the respective semantic similarity scores being above a threshold.

In one or more embodiments of the system, the processor is further configured for, prior to said selecting, based on the respective similarity scores, the set of semantically similar documents from the plurality of documents: determining, based on a number of the plurality of documents and the respective semantic similarity scores, the threshold.

Terms and Definitions

In the context of the present specification, a "text object" is intended to include various kinds of digital content from which a human understandable representation may be generated, including characters, strings, graphemes, grapheme-like units or symbols, such as letters, numerical digits, punctuation marks, spaces and the like. It will be appreciated that a text object may or may not include other types of content such as control characters, images, and the like. Thus, a text object may include or be associated with one or more words, one or more sentences, one or more paragraphs, and one or more documents. For example, a text object may comprise, be associated with or extracted from a video file, an audio file, an image, a digital book, a webpage, a PDF document, a Microsoft® Word® document, a Microsoft® PowerPoint® document and the like. A text object may also be associated with other text objects (e.g. from which it has been extracted or from which other text objects may have been extracted) and metadata.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 10 depicts a flow chart of a method of providing a semantic search interface comprising a set of semantically similar text objects in response to a search request in accordance with one or more non-limiting embodiments of the present technology.

DETAILED DESCRIPTION

Figure 1:
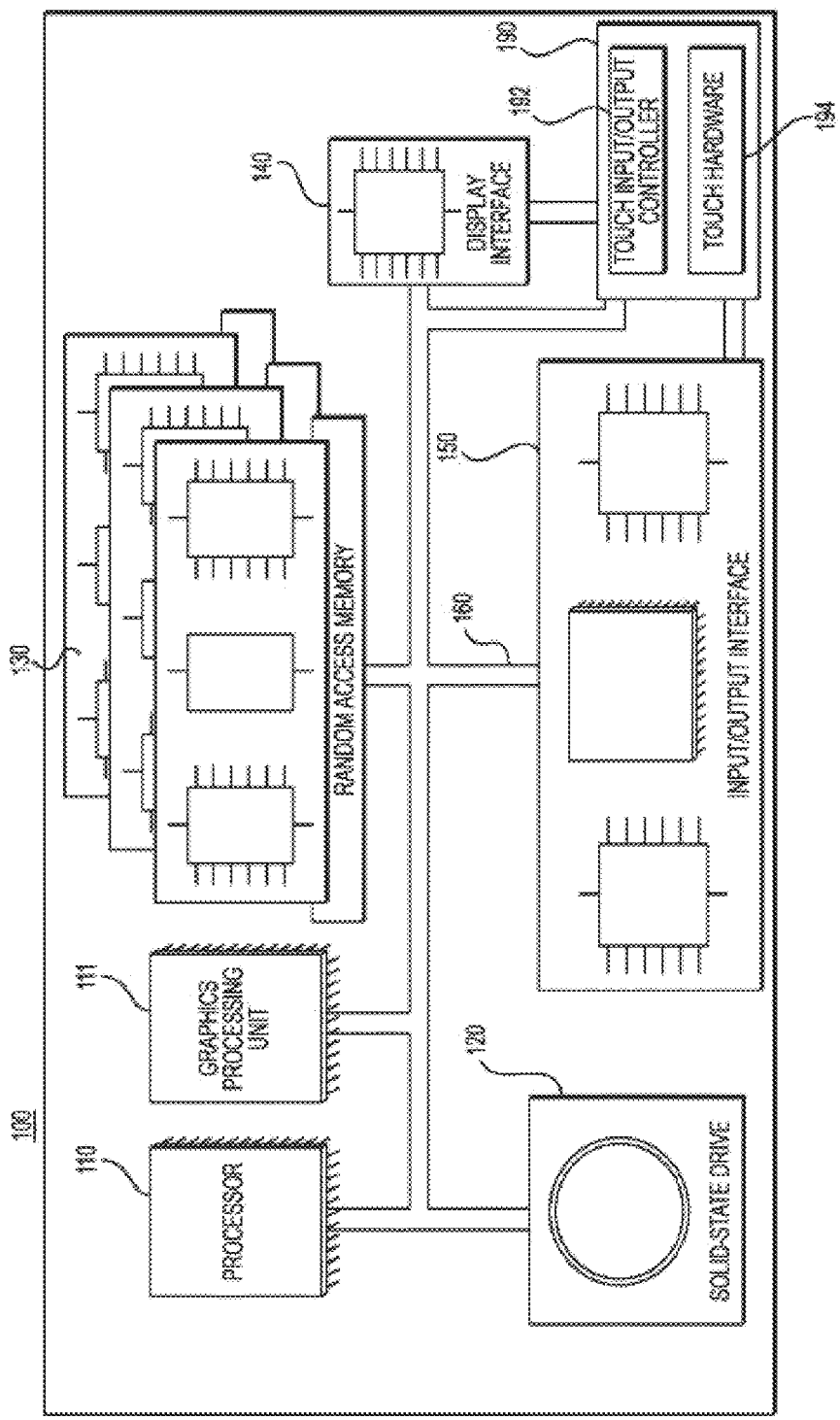
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random-access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for generating an interactive semantic search interface and performing interactive semantic searching of text objects based on a semantic similarity thereof, as will be described in more detail herein below. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
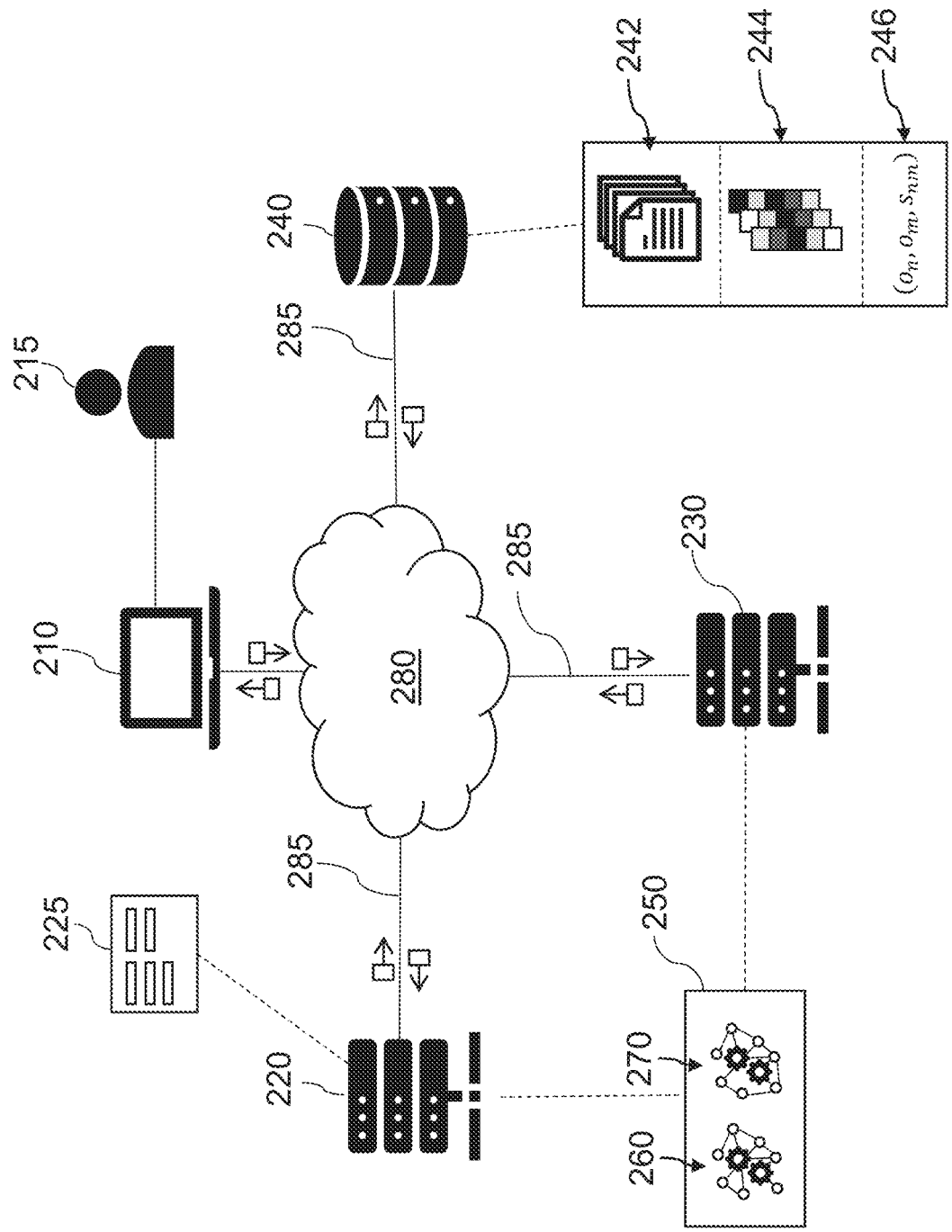
FIG. 2 depicts a schematic diagram of a communication system in accordance with one or more non-limiting embodiments of the present technology.

Now referring to FIG. 2, there is shown a schematic diagram of a communication system 200 or system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a client device 210, a search engine server 220, a training server 230, and a database 240, communicatively coupled over a communications network 280 via respective communication links 285.

Client Device

The system 200 comprises the client device 210 communicatively coupled to the communication network 280. It should be noted that the scope of the present technology is not limited to a system 200 comprising a single user device, such as the client device 210, and generally speaking, it can be said that a plurality of user devices having any number of user devices may be communicatively coupled to the communication network 280.

The client device 210, is associated with a user 215. It should be noted that the fact that the client device 210, is associated with the user 215 does not need to suggest or imply any mode of operation—such as a need to log in, a need to be registered or the like. The implementation of the client device 210, is not particularly limited, but as an example, the client device 210, may be implemented as a personal computer (desktops, laptops, netbooks, etc.), a wireless communication device (a cell phone, a smartphone, a tablet and the like), as well as network equipment (a router, a switch, or a gateway). In FIG. 2, the client device 210 is shown as a laptop.

In the context of the present technology, the client device 210 is configured to access an interactive semantic search interface 225. The interactive semantic search interface 225 may be accessible via a software application executed by the client device 210, as a non-limiting example via a stand-alone software application provided by the operator of the search engine (not shown), or via a browser application by inputting a uniform resource locator (URL) associated with the search engine. The user 215 may use the interactive semantic search interface 225 to input text objects such as documents, paragraphs, sentences, and words to search for semantically similar text objects. The user 215 may browse or explore the results provided by the interactive semantic search interface 225 and filter the results by transmitting and receiving signals over the communication network 280.

Search Engine Server

The search engine server 220 is configured to provide a search engine functionality which is based, inter alia, on semantic similarity. It will be appreciated that the search functionality of the search engine server 220 may be publicly accessible to client devices connected to the communication network 280, or the search functionality of the search engine server 220 may be a private search engine functionality only accessible to registered client devices within an enterprise for example. It is contemplated that the search engine server 220 may provide a semantic similarity search functionality in combination with a typical lexical search engine functionality.

The search engine server 220 is configured to inter alia: (i) provide an interactive semantic search interface 225 and a search engine functionality; (ii) receive, from the client device 210 at the interactive semantic search interface 225, a search request, the search request including an indication of a text object including one or more of: a document, a paragraph, a sentence, and a word; (iii) receive, based on the search request, an indication of a semantic representation of the search request; (iv) receive, based on the indication of the semantic representation of the search request, a set of potentially similar text objects each associated with a respective semantic similarity score; (v) determine, based on the respective semantic similarity scores, a set of semantically similar text objects; and (vi) provide, for display on the client device 210, an interactive semantic search interface 225 comprising the set of semantically similar text objects.

In one or more embodiments, the search engine server 220 is further configured for receiving user interactions at the interactive semantic search interface 225 and provide one or more text objects in response thereto.

How the search engine server 220 is configured to do so will be explained in more detail herein below.

It will be appreciated that the search engine server 220 can be implemented as a conventional computer server and may comprise at least some of the features of the electronic device 100 shown in FIG. 1. In a non-limiting example of one or more embodiments of the present technology, the search engine server 220 is implemented as a server running an operating system (OS). Needless to say that the search engine server 220 may be implemented in any suitable hardware and/or software and/or firmware or a combination thereof. In the disclosed non-limiting embodiment of present technology, the search engine server 220 is a single server. In one or more alternative non-limiting embodiments of the present technology, the functionality of the search engine server 220 may be distributed and may be implemented via multiple servers (not shown).

The implementation of the search engine server 220 is well known to the person skilled in the art. However, the search engine server 220 comprises a communication interface (not shown) configured to communicate with various entities (such as the database 240, for example and other devices potentially coupled to the communication network 280) via the communication network 280. The search engine server 220 further comprises at least one computer processor (e.g., the processor 110 of the electronic device 100) operationally connected with the communication interface and structured and configured to execute various processes to be described herein.

Training Server

The training server 230 is configured to inter alia: (i) receive an indication of one or more text objects including one or more of: a document, a paragraph, a sentence, and a word; (ii) generate, using a set of ML models 250, semantic representations of the one or more text objects; (iii) compare, using the set of ML models 250, the semantic representations of the one or more text objects with semantic representations of other text objects to obtain respective semantic similarity scores thereof; and (iv) provide, based on the respective semantic similarity scores, one or more semantically similar text objects with potential explanations of the semantic similarity.

How the training server 230 is configured to do so will be explained in more detail herein below.

Similarly to the search engine server 220, the training server 230 can be implemented as a conventional computer server and may comprise at least some of the features of the electronic device 100 shown in FIG. 1. In a non-limiting example of one or more embodiments of the present technology, the training server 230 is implemented as a server running an operating system (OS). Needless to say that the training server 230 may be implemented in any suitable hardware and/or software and/or firmware or a combination thereof. In the disclosed non-limiting embodiment of present technology, the training server 230 is a single server. In one or more alternative non-limiting embodiments of the present technology, the functionality of the training server 230 may be distributed and may be implemented via multiple servers (not shown).

The implementation of the training server 230 is well known to the person skilled in the art. However, the training server 230 comprises a communication interface (not shown) configured to communicate with various entities (such as the database 240, for example and other devices potentially coupled to the communication network 280) via the communication network 280. The training server 230 further comprises at least one computer processor (e.g., the processor 110 of the electronic device 100) operationally connected with the communication interface and structured and configured to execute various processes to be described herein.

In one or more embodiments, the search engine server 220 and the training server 230 are implemented as a single server.

The search engine server 220 and/or the training server 230 have access to a set of ML models. In one or more embodiments, the search engine server 220 and/or the training server 230 may execute one or more of the set of ML models 250.

Machine Learning (ML) Models

The set of ML models 250 comprises inter alia a set of semantic representation generation ML models 260 (only one shown in FIG. 2) and a set of semantic comparison ML models 270 (only one shown in FIG. 2).

Semantic Representation ML models

The set of semantic representation generation ML models 260, which will be referred to as the set of semantic representation ML models 260, comprises one or more semantic representation ML models.

A given semantic representation ML model is configured to inter alia: (i) receive an indication of a text object, the text object including one or more of: a document, a paragraph, a sentence and a word; (ii) process the text object to extract a set of features including semantic features; and (iii) generate, based on the set of features including the semantic features, a semantic representation of the text object.

The semantic representation of the text object encodes inter alia the semantic features of the text object which are indicative of its meaning. The semantic representation ML model may thus enable representing the text object in a semantic space.

A given semantic representation ML model of the set of semantic representation ML models 260 may be implemented using a neural network (NN) based architecture including but not limited to deep neural networks (DNN), convolutional neural networks (CNN), graph neural networks (GNN), support vector machines (SVM) and the like.

In one or more embodiments, a given semantic representation ML model may use techniques such as bag-of-words, tokenization, stop words removal, stemming, lemmatization, morphological segmentation, latent Dirichlet allocation (LDA), and the like to generate a semantic representation of a text object.

In one or more embodiments, a different semantic representation ML model may generate a respective semantic representation for each type of text object, i.e. a respective semantic representation ML model may be used to generate each of the document semantic representations, the paragraph semantic representations, the sentence semantic representations and the word semantic representations. However, in alternative embodiments, a given semantic representation ML model may be used to generate semantic representations of two or more different types of text objects.

In one or more embodiments, a semantic representation ML model may generate semantic representations of certain types based on other types of semantic representations, e.g. a paragraph semantic representation may be generated from a set of sentence semantic representations and/or word semantic representations. In one or more other embodiments, a given type of semantic representation (e.g. semantic representation of a document, paragraph, sentence) may be generated independently from their components or units (e.g. paragraphs, sentence, words). It should be understood that a component or unit of a given text object refers to the text objects composing the given text object.

In one or more embodiments, the semantic representation of a text object may be indicative of the semantic components of the text object, e.g. a semantic representation of a sentence may include an indication of the semantic features/representations of the words composing the sentence, a semantic representation of a paragraph may include an indication of the semantic features/representations of the sentences composing the paragraph, etc., however this does not need to be so in every embodiment of the present technology.

In one or more embodiments, a semantic representation of a text object may be generated based on its ontology components, which may be for example based on a graph of its component text objects, classes, attributes, and relations.

As a non-limiting example, for a word, the word semantic representation may be indicative of semantic properties of the word such as specificity, boundedness, animacy, gender, kinship, social status, physical properties, and function.

The set of semantic representation ML models 260 may have been previously trained to generate semantic representations of text objects during a supervised learning training procedure.

In one or more embodiments, the set of semantic representation ML models may use one or more of: word2vec, sentence2vec, doc2vec, Stanford University's GloVe, AllenNLP's Elmo, fastText, Gensim, Indraand Deeplearning4j, Principal Component Analysis (PCA) and T-Distributed Stochastic Neighbour Embedding (t-SNE), as well as transformer-based language models such as Bidirectional Encoder Representations from Transformers (BERT), and Generative Pre-trained Transformers (GPT) to generate semantic representations.

Semantic Comparison ML Models

The set of semantic comparison ML models 270 comprise one or more semantic comparison ML models. A given semantic comparison ML model of the set of semantic comparison ML models 270 is configured to inter alia: (i) receive a first semantic representation of a first text object; (ii) receive a second semantic representation of a second text object; and (ii) compare and determine, based on the semantic representations of the first text object and the second text object, a semantic similarity score indicative of a semantic similarity between the first text object and the second text object.

A semantic similarity score quantifies the similarity of two text objects in terms of their meaning and semantic content or features. The semantic similarity score may be estimated based on a defined topological similarity and ontology. It will be appreciated that the manner in which the semantic similarity score is calculated depends on inter alia how semantic representations are generated, as well as the type of semantic representation.

In one or more embodiments, the semantic similarity score may be calculated using a distance between two semantic representations in a semantic space. As a non-limiting example, the semantic similarity may be calculated using a cosine similarity between two representations. As another non-limiting example, the semantic similarity may be calculated using a distance (e.g. number of nodes or edges) between two nodes associated with the text objects in a graph.

In one or more other embodiments, a given semantic comparison ML model may be configured to compare semantic representations of a specific type of text object. As a non-limiting example, a first semantic comparison ML model may be used to compare pairs of semantic representations of words, a second semantic comparison ML model may be used to compare pairs of semantic representation of sentences, a third semantic comparison ML model may be used to compare pairs of semantic representations of paragraphs, etc.

Additionally or alternatively, one or more other semantic comparison ML models may be used to compare semantic representations of different types of objects. As a non-limiting example, a fourth semantic comparison ML model may be used to compare pairs including semantic representations of documents and words, a fifth semantic comparison ML model may be used to compare pairs including semantic representations of a sentence and a paragraph, etc.

In some embodiments, different types of text objects may be compared via their components of the same type, e.g. a document and a given sentence may be compared by comparing the sentences in the document with the given sentence and the words in the document with the words in the given sentence.

In one or more embodiments, a given semantic comparison ML model may determine semantic similarity scores based on a topological similarity of text objects, which may include edge-based approaches and/or node-based approaches. In one or more alternative embodiments, a given semantic representation ML model may determine a semantic similarity based on pairwise ontological instances and/or groupwise ontological instances.

In one or more embodiments, a given semantic comparison ML model may determine a semantic relation between the representations of two text objects. Non-limiting examples of semantic relations include synonym, antonym, gradable, relational opposite, metonymy, and retronym. The semantic relation may be used to determine a semantic similarity score.

In one or more other embodiments, a given semantic comparison ML model may determine a semantic similarity based on statistical similarity techniques such as, but not limited to, latent semantic analysis (LSA), pointwise mutual information (PMIO), second-order pointwise mutual information (SO-PMIO), Generalized Latent Semantic Analysis (GLSA), Normalized Google distance (NGD), Twitter semantic similarity (TSS), normalized compressed distance (NCD), explicit semantic analysis (ESA), salient semantic analysis (SSA), and Vector Generation of an Explicitly-defined Multidimensional Semantic Space (VGEM).

A given semantic comparison ML model may have been trained in a supervised manner during a supervised learning procedure or may have been trained in an unsupervised manner during an unsupervised learning procedure. It is contemplated that one or more semantic comparison ML models may use clustering techniques to perform semantic comparisons and determine semantic similarity scores.

In one or more embodiments, to determine a semantic similarity score between two semantic representations, a given semantic comparison ML model may compare semantic representations through "intermediate" steps or scores, which may then be used to obtain the semantic similarity score. As a non-limiting example, one semantic comparison ML model may determine a type of semantic relation between two text objects, which then may be used by another semantic comparison ML model to determine a semantic similarity score.

In one or more embodiments, one or more of the semantic comparison ML models 270 may be used to generate human-understandable indications of the semantic similarity between two objects when calculating a semantic similarity score, so as to form a potential explanation of the semantic similarity. As a non-limiting example, the human-understandable indications may include an indication of components of the respective text objects having been determined to be semantically similar and their respective semantic similarity scores, the relations of the text objects and their components, etc. The potential explanation of the semantic similarity may thus enable a user such as the user 215 to understand at least partially how the comparison is performed by the semantic comparison ML models.

In one or more embodiments, the training server 230 may execute one or more of the set of ML models 250 including the set of semantic representation ML models 260 and the set of semantic comparison ML models 270. In one or more alternative embodiments, one or more of the set of ML models 250 may be executed by another server (not shown), and the training server 230 may access the one or more of the set of ML models 250 for training or for use by connecting to the server (not shown) via an API (not shown), and specify parameters of the one or more of the set of ML models 250, transmit data to and/or receive data from the set of ML models 250, without directly executing the one or more of the set of ML models 250.

As a non-limiting example, one or more ML models of the set of ML models 250 may be hosted on a cloud service providing a machine learning API.

Database

A database 240 is communicatively coupled to the training server 230 via the communications network 280 but, in one or more alternative implementations, the database 240 may be communicatively coupled to the training server 230 without departing from the teachings of the present technology. Although the database 240 is illustrated schematically herein as a single entity, it will be appreciated that the database 240 may be configured in a distributed manner, for example, the database 240 may have different components, each component being configured for a particular kind of retrieval therefrom or storage therein.

The database 240 may be a structured collection of data, irrespective of its particular structure or the computer hardware on which data is stored, implemented or otherwise rendered available for use. The database 240 may reside on the same hardware as a process that stores or makes use of the information stored in the database 240 or it may reside on separate hardware, such as on the training server 230. The database 240 may receive data from the training server 230 for storage thereof and may provide stored data to the training server 230 for use thereof.

In one or more embodiments of the present technology, the database 240 is configured to inter alia: (i) store a corpus including a plurality of text objects 242, the plurality of text objects 242 including a plurality of documents, paragraphs, sentences and words; (ii) store a plurality of semantic representations 244 of the plurality of text objects; (iii) store semantic similarity scores 246 indicative of a semantic similarity of pairs of text objects via their semantic representations; and (iv) store potential explanations (not shown) for the semantic similarity scores.

In one or more embodiments, the database 240 may further store one or more of: associations between types of text objects (e.g., for a word, an indication from which sentence the word has been extracted, from which document he word has been extracted, etc.), associations between different types of semantic representations (e.g., semantic relation, semantic similarity score, and semantic components), and associations between text objects and semantic representations (e.g., showing from which text object a semantic representation has been generated from). The database 240 may also store ontologies related to the plurality of text objects 242 including individuals, classes, attributes, relations, function terms, restrictions, rules, axioms, and events.

In one or more embodiments, the database 240 stores metadata of text objects and their semantic representations. The metadata may include as a non-limiting example date the text object was written, the source of the text object, the author, the subject matter (as a keyword/tag) etc. or anything that is not necessarily inferable from the text in the text object itself but might be relevant to a user in their search and comparison task.

Communication Network

In one or more embodiments of the present technology, the communications network 280 is the Internet. In one or more alternative non-limiting embodiments, the communication network 280 may be implemented as any suitable local area network (LAN), wide area network (WAN), a private communication network or the like. It will be appreciated that implementations for the communication network 280 are for illustration purposes only. How a communication link 285 (not separately numbered) between the training server 230, the database 240, and/or another electronic device (not shown) and the communications network 280 is implemented will depend inter alia on how each electronic device is implemented.

The communication network 280 may be used in order to transmit data packets amongst the client device 210, the search engine server 220, the training server 230, and the database 240. For example, the communication network 280 may be used to transmit search requests from the client device 210 to the search engine server 220 and to the training server 230. In another example, the communication network 280 may be used to transmit the response from the training server 230 to the search engine server 220 to the client device 210.

Figure 3:
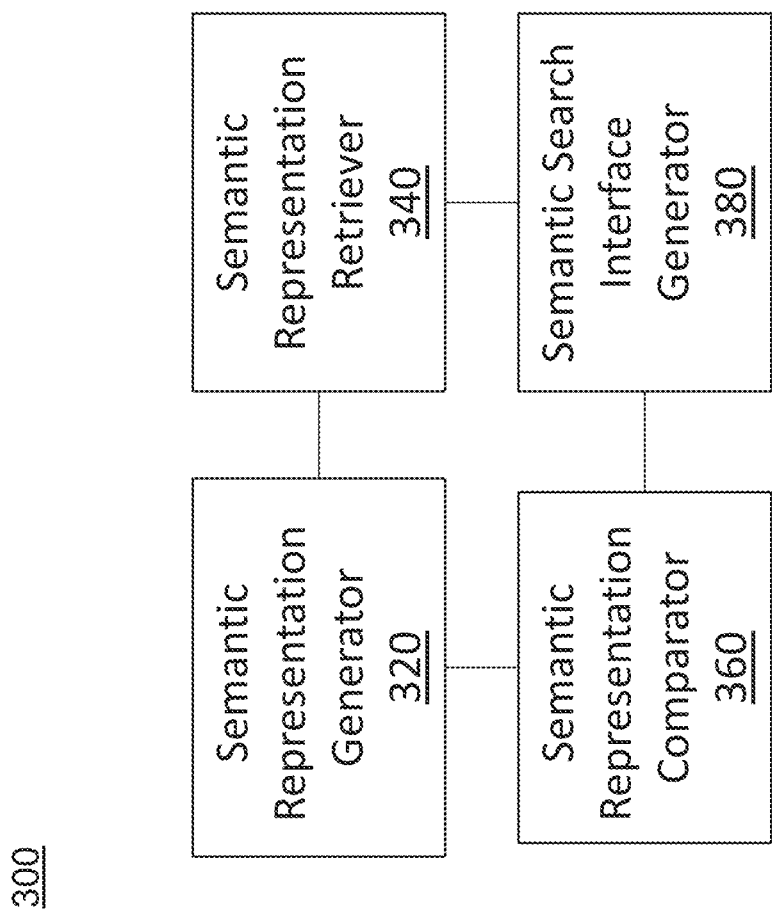
FIG. 3 depicts a schematic diagram of components of a semantic search system in accordance with one or more non-limiting embodiments of the present technology.

With reference to FIG. 3 there is shown a schematic diagram of different components of a semantic search system 300 in accordance with one or more non-limiting embodiments of the present technology.

Semantic Search System

The semantic search system 300 comprises inter alia a semantic representation generator 320, a semantic representation retriever 340, a semantic representation comparator 360, and a semantic search interface generator 380.

It will be appreciated that the semantic search system 300 may comprise more or less components and their functionality may be combined.

In one or more embodiments of the present technology, the search engine server 220 and the training server 230 execute the semantic search system 300. In alternative embodiments, the training server 230 or the search engine server 220 may execute the semantic search system 300. The semantic search system 300 may be executed in a distributed manner.

It will be appreciated that another processing device operatively connected to a non-transitory storage medium may execute the semantic search system 300 without departing from the scope of the present technology.

Figure 4:
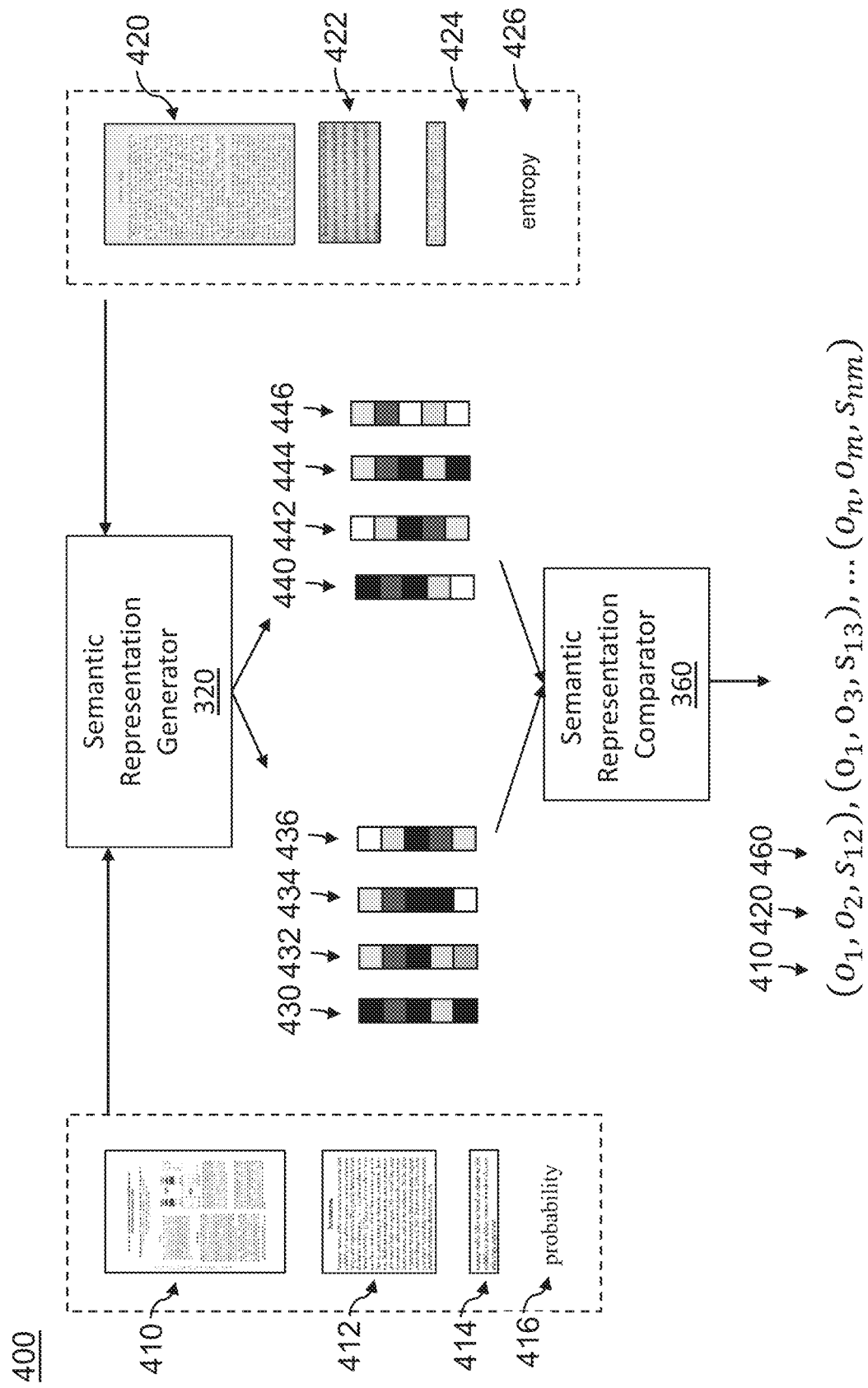
FIG. 4 depicts a schematic diagram of a semantic generation and comparison procedure in accordance with one or more non-limiting embodiments of the present technology.

Turning now to FIG. 4 with continuing reference to FIG. 3, there is shown a schematic diagram of a semantic representation generation and comparison procedure 400 in accordance with one or more non-limiting embodiments of the present technology.

Semantic Representation Generation and Comparison Procedure

The semantic representation generation and comparison procedure 400 may be executed asynchronously or synchronously.

In one or more embodiments, the semantic representation generation and comparison procedure 400 is executed upon receiving an indication to do so, e.g. by receiving, from the search engine server 220, an indication of one or more to text objects for which to generate a semantic representation. Additionally or alternatively, the semantic representation generation and comparison procedure 400 may be executed offline according to predetermined criteria, as a non-limiting example by generating semantic representations for at least a portion of the plurality of text objects 242 stored in the database 240 according to a predetermined schedule.

The semantic representation generation and comparison procedure 400 will now be described for different types of text objects.

The semantic representation generation and comparison procedure 400 is performed by using inter alia the semantic representation generator 320. The semantic representation generator 320 may access one or more of the set of ML models 250 as will be described herein.

Semantic Representation Generator

The semantic representation generator 320 is configured to inter alia: (i) receive indications of words 416, 426 and generate, using the set of semantic representation ML models 260, word semantic representations 436, 446 thereof; (ii) receive indications of sentences 414, 424 and generate, using the set of semantic representation ML models 260 sentences semantic representations 434, 444 thereof (iii)

receive indications of paragraphs 412, 422 and generate, using the set of semantic representation ML models 260, paragraph semantic representations 432, 443 thereof and (iv) receive indications of documents 410, 420 and generate, using the set of semantic representation ML models 260, document semantic representations 430, 440 thereof.

In the following, "document(s) semantic representation(s)" will be referred to as "document(s) representation(s)", "paragraph(s) semantic representation(s)" will be referred to as "paragraph(s) representation(s)", "sentence(s) semantic representation(s)" will be referred to as "sentence(s) representation(s)", and "word semantic representations" will be referred to as "word(s) representation(s)".

The purpose of the semantic representation generator 320 is to process a text object, e.g., document, paragraph, sentence, word, or a combination thereof so as to generate a machine understandable representation of its meaning in a semantic space, such that at least semantic representations of the same type of text objects (i.e., document-document, paragraph-paragraph, sentence-sentence, word-word) may be compared to each other and the semantic similarity (or dissimilarity) of the text objects may be quantified via a semantic similarity score. To achieve that purpose, the semantic representation generator 320 uses one or more of the set of semantic representation ML models 260, as explained above.

The semantic representation generator 320 uses one or more of the set of semantic representation ML models 260 to generate each of the document representation 430, 440, the paragraph representation 432, 442, the sentence representations 434, 444 and the word representations 436, 446. In one or more embodiments, the semantic representation generator 320 may use a different representation ML model to generate each of the document representation 430, 440, the paragraph representation 432, 442, the sentence representations 434, 444 and the word representations 436, 446.

It will be appreciated that the semantic representation generator 320 may generate each of the document representation 430, 440, the paragraph representation 432, 442, the sentence representations 434, 444 and the word representations 436, 446 at different times.

In one or more embodiments, the semantic representation generator 320 may generate the document representation 430, 440, the paragraph representation 432, 442, the sentence representations 434, 444 and the word representations 436, 446 in parallel.

In one or more embodiments, the semantic representation generator 320 has access to the plurality of text objects 242 stored in the database 240 including one or more of: a plurality of documents, a plurality of paragraphs, a plurality of sentences, and a plurality of words. Additionally, the semantic representation generator 320 may prefilter one or more of the text objects by using known NLP techniques before generating a semantic representation thereof.

In one or more embodiments, the semantic representation generator 320 may use metadata to generate the semantic representations of the text objects. As a non-limiting example, the semantic representation generator 320 may have access to a semantic database in the database 240 including additional information about text objects such as their semantic relations and related concepts, which may assist the semantic representation generator 320 using the set of semantic representation ML models in generating the semantic representations. As a non-limiting example, the additional information about the text objects may be used to add additional features to the semantic representations of the text objects. It is contemplated that the semantic representation generator 320 may use additional sources of information such as text corporas of various languages, linguistic databases, etc. to perform generation of the different types of representations.

In one or more alternative embodiments, ML models may be used to perform one or more of lexical analysis, syntactic analysis, disclosure integration, pragmatic analysis, and integrate one or more of lexical, syntactic, disclosure integration and pragmatic features as additional information associated with the semantic representations.

In one or more other embodiments, semantic representations may be associated with a user intent, which may be for example inferred by analyzing a past user history of the user performing the search and/or receiving information about the user performing the search.

In some embodiments, the semantic representation generator 320 may receive indication of Boolean operators (e.g. OR, AND, NOT) in combination with the indication of the text object for which to generate the semantic representation. The semantic representation generator 320 may integrate the Boolean operator in the generation of the respective semantic representation, or may associate an indication of the Boolean operator which may be processed at later stages by the semantic representation comparator 360, the semantic representation retriever 340, and the semantic search interface generator 380

Word Representation

In one or more embodiments, the semantic representation generator 320 generates, for a given word 416, a respective word representation 436. The respective word representation is indicative of semantic features of the given word 416 and captures at least a portion of its meaning.

In one or more embodiments, for the given word 416, the word representation 436 may be indicative of semantic properties of the given word 416 such as specificity, boundedness, animacy, gender, kinship, social status, physical properties, and function.

As a non-limiting example, the semantic representation generator 320 could generate word representations using the word2vec algorithm.

The semantic representation generator 320 may store the respective word representation 436 in the database 240.

Sentence Representation

The semantic representation generator 320 generates, for a given sentence 414, a respective sentence representation 434. The respective sentence representation 434 is indicative of semantic features of the text content of the given sentence 414 and thus captures at least a portion of its meaning.

In one or more embodiments, the semantic representation generator 320 generates the respective sentence representation 434 based on word representations of the words included in the given sentence 414. In some embodiments, when generating the respective sentence representation 434 based on the word representations, the semantic representation generator 320 may have an indication of the words having contributed to the semantics of sentence representation, i.e. indication of the words having contributed "more" to the meaning of the given sentence 414 in the respective sentence representation 434 may be stored together with an indication of their relative importance. In such embodiments, the words having contributed to the meaning of the given sentence 414 may be considered as being keywords.

As a non-limiting example, the semantic representation generator 320 may generate sentence representations using the sentence2vec algorithm.

The semantic representation generator 320 may store the respective sentence representation 434 in the database 240.

Paragraph Representation

In one or more embodiments, the semantic representation generator 320 generates, for a given paragraph 412, a respective paragraph representation 432. The respective paragraph representation 432 is indicative of a semantic features of the text content of the paragraph and captures at least a portion of its meaning.

It will be appreciated that a paragraph includes at least two sentences. The given paragraph 412 may be originally part of the document 410, or may be independent therefrom.

In some embodiments, the semantic representation generator 320 generates, for at least a portion of the sentences in the given paragraph 412, respective sentence representations, and generates the respective paragraph representation 432 based on the respective sentence representations.

In some embodiments, when generating the respective paragraph representation 432 based on the sentence representations, the semantic representation generator 320 may store an indication of relative contribution of the sentences in the given paragraph 412 to the semantics of the given paragraph 412. It will be appreciated that the same may be done for the words composing the sentences in the given paragraph 412.

In one or more alternative embodiments, the respective paragraph representation 432 may be generated independently from the semantic representations of sentences and words included therein.

In one or more embodiments, the respective paragraph representation 432 may be associated with one or more of: other paragraph representations from the same document the paragraph 412 has been extracted from (in cases where the paragraph 412 has been extracted from a document), other sentences representations in the document, and word representations in the document that may have been generated from the text content of the document.

The semantic representation generator 320 may store the respective paragraph representation 432 in the database 240 in association with the given paragraph 412.

Document Representation

The semantic representation generator 320 generates, for a given document 410, a respective document representation 430. The respective document representation 430 is indicative of semantic features of the text content of the given document 410 and thus captures at least a portion of its meaning.

In one or more embodiments, the semantic representation generator 320 may receive a set of documents in the form of a cluster, and generate a cluster document representation thereof. As a non-limiting example, the cluster document representation may be a function such as an average of the document representations in the cluster.

In some embodiments, the semantic representation generator 320 generates, for at least a portion of the paragraphs in the given document 410, respective paragraph representations, and generates the respective document representation 430 based on the respective paragraph representations. It will be appreciated that the same may be done with component sentences and paragraphs in the given document 410 as well as component words of the sentences in the given document 410.

In some embodiments, when generating the respective document representation 430 based on the paragraph and sentence representations of sentences and paragraphs included in the document 410, the semantic representation generator 320 may store an indication of relative contributions of the paragraphs and sentences to the semantics of the given document 410.

In one or more embodiments, the respective document representation 430 may be associated with one or more of a paragraph representation, a sentence representation, a word representation that may also be generated from the text content of the given document 410. As a non-limiting example, the document representation may be a sum or an average of its component representations, which may include one or more of the respective paragraph representation 432, the respective sentence representation 434, and the respective word representation 436.

In one or more embodiments, the semantic representation generator 320 may obtain a graph of the semantic concepts associated with the given document 410, which may be used to generate the respective document representation 430.

As a non-limiting example, the semantic representation generator 320 may generate document representations using the doc2vec algorithm.

The semantic representation generator 320 may store the respective document representation 430. in the database 240 in association with the given document 410.

Still referring to FIG. 3 and FIG. 4, the semantic representation comparator 360 will now be described in accordance with one or more non-limiting embodiments of the present technology.

Semantic Representation Comparator

The semantic representation comparator 360 is configured to inter alia: (i) receive a first semantic representation comprising one or more of: the word representation 436, the sentence representation 434, the paragraph representation 432, and the document representation 430; (ii) receive a second semantic representation comprising one or more of: another word representation 446, another sentence representation 444, another paragraph representation 442, and another document representation 440; and (iii) compare, by using the set of semantic comparison ML models 270, the first semantic representation and the second semantic representation by determining a semantic similarity score 460 indicative of a semantic similarity between the respective text object 410, 412, 414, 416 associated with the first semantic representation 430, 432, 434, 436 and the respective text object 420, 422, 424, 426 associated with the second semantic representation 440, 442, 444, 446.

The semantic representation comparator 360 uses one or more of the set of semantic comparison ML models 270 to determine a semantic similarity between two text objects. It is contemplated that the semantic representation comparator 360 may use topological similarity and/or statistical similarity techniques to determine the semantic similarity score between two text objects, in addition to the set of semantic comparison ML models 270.

The semantic representation comparator 360 determines a semantic similarity score. The semantic similarity score is indicative of a level of semantic similarity between two text objects and thus indicates how "close" the text objects are in terms of their respective meanings. In one or more embodiments, the semantic representation comparator 360 may use edge-based, node-based, pairwise and groupwise techniques to determine the semantic similarity score, and may provide an indication of the type of technique used together with similarity score. As a non-limiting example, the semantic representation comparator 360 may output the types of relations considered between two text object representations, as well as a distance between the representations, and the most important components of the two text objects and features that have been used to determine the semantic similarity score. Thus, the semantic representation comparator 360 enables determining if two text objects are similar based on their meaning and not only their lexical components.

As a non-limiting example, two given paragraphs to compare may have different words and sentences but convey the same meaning, and thus have a "high" semantic similarity score. Conversely, the semantic representation comparator 360 may also calculate a "low" semantic similarity score for two text objects which seem to convey the same meaning based on the similar words used, but which may have different meanings to a human reader.

The semantic representation comparator 360 receives one or more semantic representations of text objects to compare from the semantic representation generator 320. In one or more embodiments, the semantic representation comparator 360 receives one or more of the semantic representations of the text objects to compare from the database 240.

It will be appreciated that to perform comparison of semantic representations, the semantic representation comparator 360 may be configured to do so in response to receiving an indication (e.g. from the search engine server 220), and/or may perform the comparison offline and according to a predetermined schedule.

It will be appreciated that the semantic similarity score may be a binary score, a discrete score, or a continuous score. The semantic representation comparator 360 may use one or more of the set of semantic comparison ML models 270 to obtain the semantic similarity score.

In one or more embodiments, the semantic representation comparator 360 may perform comparison of semantic representations to determine a semantic similarity score in a plurality of processing steps, and provide indications of the one or more of the processing steps as a potential explanation for the determined semantic similarity score.

In some embodiments, to compute the semantic similarity between two text objects, the semantic representation comparator 360 may compute the semantic similarity score between the representation components of the two text objects. As a non-limiting example, to compare the paragraph representation 432 and the other paragraph representation 442, the semantic representation comparator 360 may compare at least some of the sentences and word representations of the sentences and words in the paragraphs 412, 422, which may be used to determine the semantic similarity score between the paragraph representation 432 and the other paragraph representation 442. The semantic representation comparator 360 provides an indication of the components used to determine the semantic similarity score, which may be used as most relevant keywords and passages displayed together with the paragraphs 412, 422.

Semantic Representation Retriever

The semantic representation retriever 340 is configured to inter alia: (i) receive an indication comprising one or more of: a text object to compare and a semantic representation of the text object to compare; (ii) determine, based on the indication, a set of potentially similar text objects to compare; (iii) receive, based on the set of potentially similar text objects to compare, a set of semantic similarity scores between each of the set of potentially similar text objects and the text object; and (iv) determine, based on the set of semantic similarity scores, a set of semantically similar objects, each object of the set of semantically similar objects being semantically similar to the text object.

It will be appreciated that the semantic representation retriever 340 may be used to interconnect and provide input and output data to each of the semantic representation generator 320, the semantic representation comparator 360, and the semantic search interface generator 380.

The semantic representation retriever 340 receives an indication of a semantic representation of a text object to compare. It will be appreciated that the semantic representation retriever 340 may receive an indication of the text object, an indication of the semantic representation of the text object, or a combination thereof. In some embodiments, when receiving one of the text object and its semantic representation, the semantic representation retriever 340 may retrieve another one of the text object and its semantic representation, as a non-limiting example from the database 240.

The semantic representation retriever 340 determines a set of potentially relevant or potentially semantically similar text objects from the plurality of text objects 242 stored in the database 240. The set of potentially similar text objects includes at least a portion of the plurality of text objects 242 stored in the database 240. It is contemplated that in some embodiments, the set of potentially similar text objects includes all of the plurality of text objects 242 stored in the database 240.

In one or more embodiments, the semantic representation retriever 340 may use clustering models and techniques to determine the set of potentially semantically similar text objects from the database 240, e.g. the set of potentially similar text objects may be part of the same cluster as the text object to compare, which may indicate that such text objects are potentially semantically similar to the text object.

It will be appreciated that in some embodiments of the present technology, the database 240 may store semantic similarity scores between the text object and other text objects from the plurality of text objects 242, and in such embodiments, the semantic representation retriever 340 may retrieve the semantic representations of the other text objects. This may be the case for example when the semantic similarity scores between text objects are computed offline.

It will be appreciated that different techniques may be used by the semantic representation retriever 340 for retrieving the representations from the database 240. In instances where a Boolean operator or filters are associated with the text object to compare, the semantic representation retriever 340 may apply the Boolean operator and filter during retrieval.

In one or more embodiments, known information retrieval (IR) techniques may be used to retrieve text objects such as documents at least partially relevant to the text object to compare. As a non-limiting example, it may be the same functionality that a search engine provider uses to retrieve documents from a search index comprising posting lists before performing a ranking of the retrieved documents. In one or more embodiments, an indication of text objects associated with the document, which may include one or more of the paragraphs, sentences and words included therein may also be determined and retrieved with the documents.

Having determined which text objects to compare with the input text object to obtain the set of potentially semantically similar text objects, the semantic representation retriever 340 is configured to provide an indication of the set of potentially semantically similar text objects to the semantic representation generator 320 such that their respective semantic representations may be generated. In one or more other embodiments, where semantic representations have been pre-generated and stored in the database 240, the semantic representation retriever 340 may retrieve the semantic representations associated with the set of potentially semantically similar text objects from the database 240.

The semantic representation retriever 340 provides, to the semantic representation comparator 360, an indication of the semantic representation of the text object to compare and the respective semantic representations associated with the set of potentially semantically similar text objects for comparison thereof.

The semantic representation retriever 340 receives, from the semantic representation comparator 360, for each pair comprising the text object to compare and a respective one of the set of potentially semantically similar text objects, a respective semantic similarity score indicative of a level of semantic similarity.

In one or more embodiments, the semantic representation retriever 340 determines a threshold dynamically based on at least one of a number of text objects, the type of text objects, and the respective similarity scores of the text objects. In one or more other embodiments, the threshold may be predetermined.

The semantic representation retriever 340 determines a set of semantically similar text objects based on the threshold. In one or more embodiments, the semantic representation retriever 340 selects the set of relevant text objects from the set of potentially semantically similar text objects based on a similarity score threshold. As a non-limiting example, the semantic representation retriever 340 may select text objects associated with semantic similarity score that is equal to or above 0.8 on a scale of 1.

In one or more other embodiments, the set of semantically similar text objects may comprise a predetermined number of text objects having a highest similarity score selected from the set of potentially semantically similar text objects. As a non-limiting example, the semantic representation retriever 340 may order the set of potentially similar text objects by descending similarity scores and select the top 20 text objects as the set of semantically similar text objects.

In one or more alternative embodiments, the semantic representation retriever 340 selects the set of potentially semantically similar text objects from the set of potentially similar text objects such that it comprises a predetermined number of text object of each type, i.e. a predetermined number of documents, predetermined number of paragraphs, predetermined number of sentences, and predetermined number of words.

In one or more embodiments, the semantic representation retriever 340 is further configured to retrieve additional information associated with the set of semantically similar text objects, such as the respective semantic similarity scores, and the processing steps having been used by the semantic representation comparator 360 to determine the respective semantic similarity scores.

The semantic representation retriever 340 provides the set of relevant text objects to the semantic search interface generator 380.

Semantic Search Interface Generator

The semantic search interface generator 380 is configured to inter alia: (i) receive a search request including an indication of a text object; (ii) receive, based on the search request, a set of semantically similar text object; and (iii) generate the interactive semantic search interface 225 comprising the set of semantically similar text objects to be provided in response to the search request.

In one or more embodiments, the semantic search interface generator 380 is further configured to: (iv) receive a user interaction with the interactive semantic search interface 225, and (v) modify, based on the user interaction, at least a portion of the interactive semantic search interface 225.

The semantic search interface generator 380 may receive the indication of the search request from a client device such as the client device 210 via the communications network 280. As a non-limiting example, the user 215 may be interested in finding more information about a given subject and may input at the interactive semantic search interface 225 on his client device 210 one or more documents, one or more paragraphs, one or more sentences and one or more words.

The search engine server 220 may receive the input search request and provide an indication thereof to the semantic representation retriever 340. The semantic representation retriever 340 may verify if a semantic representation of the given input search request is present in the database 240 by querying the database 240. If the semantic representation of the input search request is not present in the database 240, the semantic representation retriever 340 may provide an indication thereof to the semantic representation generator 320 to cause generation of the semantic representation of the search request. It will be appreciated that the semantic representation of the search request may be at least one of the word representation 436, the sentence representation 434, the paragraph representation 432, and the document representation 430.

The semantic search interface generator 380 may communicate with the semantic representation retriever 340, the semantic representation generator 320, the semantic representation comparator 360, and receive the set of semantically similar text objects.

The semantic search interface generator 380 receives the set of semantically similar text objects from the semantic representation retriever 340. The semantic search interface generator 380 generates the interactive semantic search interface 225 comprising the set of semantically similar text objects.

In one or more embodiments, the semantic search interface generator 380 receives, based on the set of semantically similar text objects, additional information having been used to determine the semantic similarity of the set of semantically similar text objects by the semantic representation comparator 360. As a non-limiting example, the semantic search interface generator 380 may receive, for at least one given text object of the set of semantically similar text object, a component text object having been used to determine that the given text object is semantically similar.

As explained herein above, the additional information may include, for each of the set of semantically similar text objects, the respective similarity scores determined by the semantic representation comparator 360, the respective components and similarity scores of the text objects having been determined to be semantically similar by the semantic representation comparator 360, as well as the relative contribution of the components to the semantic similarity with the search request. The additional information may provide an indication to how each of the set of relevant text object was determined to be semantically similar by the semantic representation comparator 360. The additional information has a human understandable form and provides a potential explanation of why the text object was determined to be semantically similar.

In some embodiments, the semantic search interface generator 380 integrates the additional information with visual indicators in the interactive semantic search interface 225. In one or more other embodiments, the semantic search interface generator 380 integrates and retrieves the additional information only in response to user interactions (e.g., a selection by the user 215 of a given text object on the interactive semantic search interface 225)

The semantic search interface generator 380 may provide filters to filter the set of semantically similar text objects based on different types of text objects, dates, locations, specific words, semantic similarity scores. In some embodiments, the filters may be provided as a function of the type of text object in the search request. As a non-limiting example, common metadata of the set of semantically similar text objects may be used to provide filters.

In some embodiments, the semantic search interface generator 380 is configured to modify and generate portions of the interactive semantic search interface 225 in response to receiving user interactions from the user 215 of the client device 210.

As a non-limiting example, the user 215 may select a given text object of the set of semantically similar text objects, and the semantic search interface generator 380 may provide, in response to the selection of the given text object, an indication of how the semantic similarity with the given object was determined. e.g. the given object may be a paragraph and may comprise components (sentences and words) which have been determined to be similar to the search request, and the semantic search interface generator 380 may provide a visual indication by emphasizing (e.g., highlighting, underlining, bolding, etc.) the components to show to the user 215 why the given text object is considered to be similar to the search request. This enables the user 215 to understand the relation between the selected text object and the search query. It will be appreciated that the semantic search interface generator 380 may cause the semantic representation retriever 340, the semantic representation generator 320, the semantic representation comparator 360 to retrieve the components objects, and to perform generation and comparison of semantic representations in real-time. It is contemplated that some of the component text objects, their respective semantic representations and the comparisons may be determined before the user interaction and stored in the database 240.

In one or more embodiments, the user 215 may interact on the client device 210 by selecting a filter and/or a Boolean operator. In response, the semantic search interface generator 380 is configured to modify and generate portions of the interactive semantic search interface 225 in response to the selected filters and/or Boolean operators. In some embodiments, the semantic search interface generator 380 may provide an indication of the selected filters and Boolean operators to the semantic representation generator 320, the semantic representation retriever 340 and/or the semantic representation comparator 360, so as to generate another set of semantically similar text objects to integrate to the interactive semantic search interface 225 by following the same procedure as explained above.

Thus, it will be appreciated that the interactive semantic search interface 225 may be used by the user 215 to receive responses to questions as well as potential explanations due to the consideration of the semantics of the search request by the semantic search system 300, which enables capturing at least partially the user's search intent and the contextual meaning of the input search request. The user 215 may also explore different types or levels of semantic similarities with the input search request on the interactive semantic search interface 225.

In one or more embodiments, the semantic search interface generator 380 may generate a different interactive semantic search result interface 225 depending on the type of input search request.

Non-limiting examples of the interactive semantic search interface 225 will now be described with reference to FIG. 5 to FIG. 9.

Semantic Search Interfaces

Figure 5:
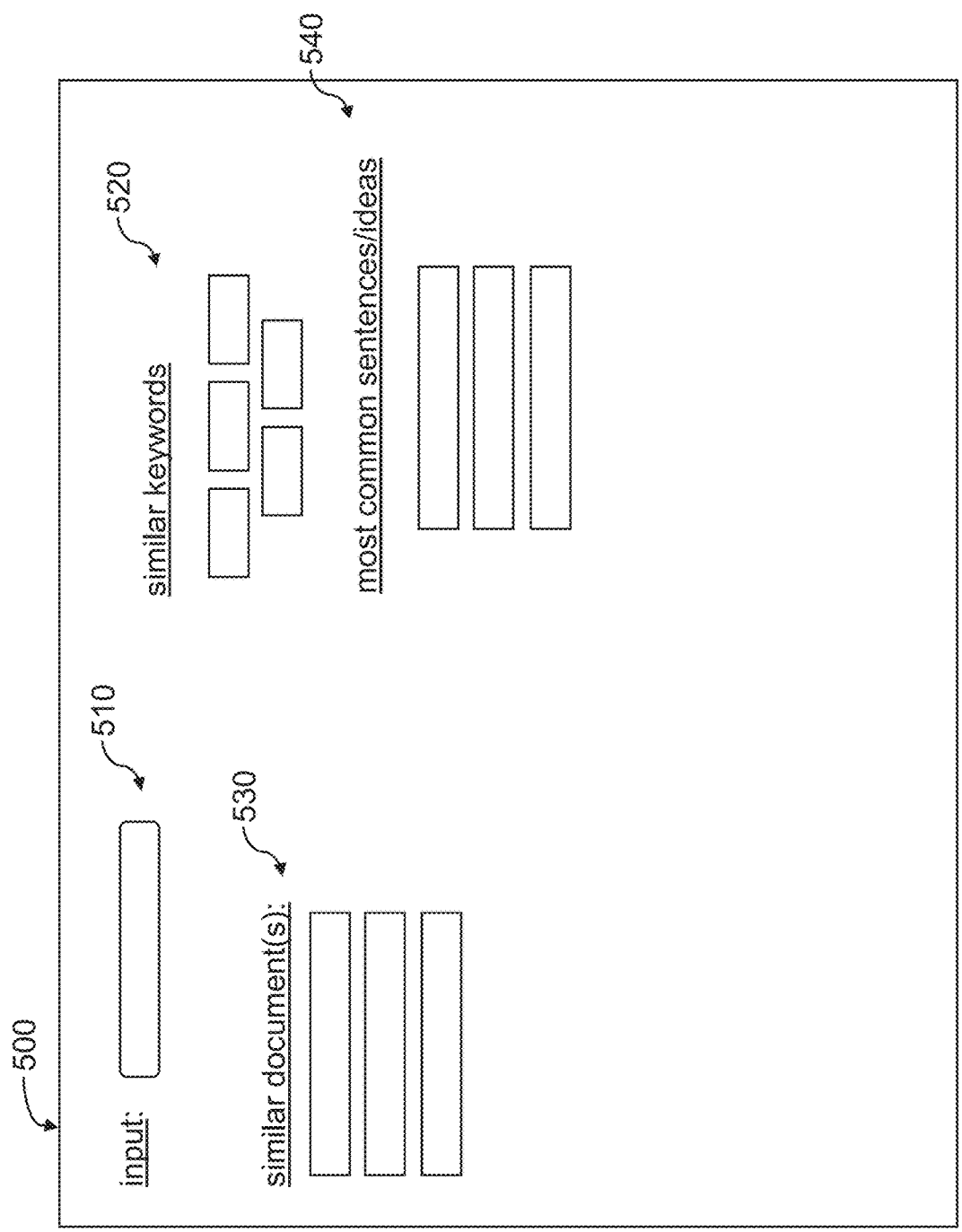
FIG. 5 depicts a schematic diagram of a first semantic search interface in accordance with one or more non-limiting embodiments of the present technology.

FIG. 5 shows a first interactive semantic search interface 500 with an input keyword 510 as the input text object. The first interactive semantic search interface 500 comprises a set of semantically similar keywords 520, a set of semantically similar documents 530 and a set of semantically similar sentences 540 having been determined to be semantically similar to the input keyword 510 by the semantic search system 300. The user 215 may select a semantically similar text object such as one of the set of semantically similar keywords 520, the set of semantically similar documents 530 and the set of semantically similar sentences 540 to display more details about how the semantic similarity of the text object was determined, such as the respective similarity score (not shown), the respective components text objects in the text object (not shown), and the like.

Figure 6:
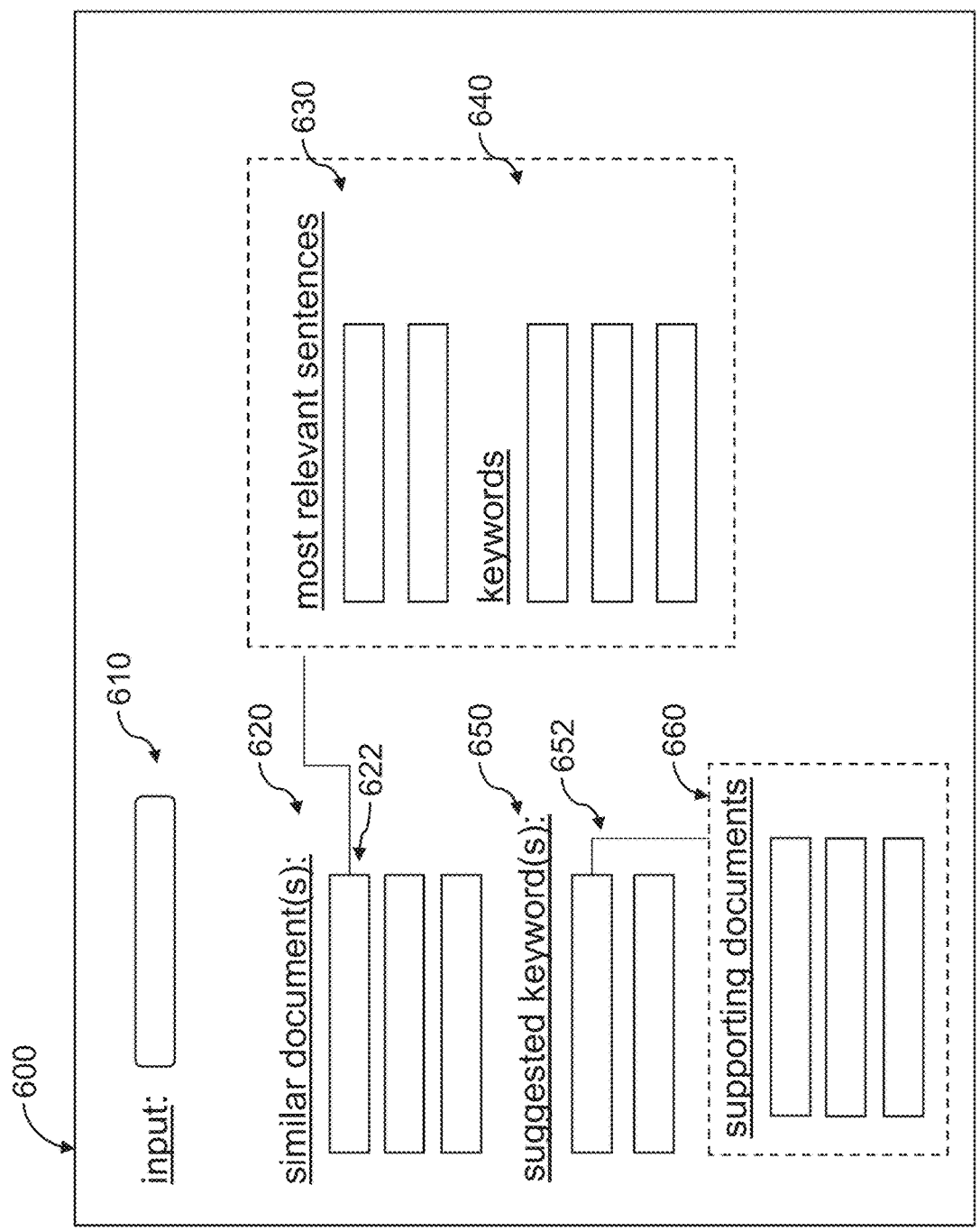
FIG. 6 depicts a schematic diagram of a second semantic search interface in accordance with one or more non-limiting embodiments of the present technology.

FIG. 6 shows a second interactive semantic search interface 600 with an input document 610 as the input text object. The second interactive semantic search interface 600 comprises a first set of semantically similar documents 620, where a first document 622 has been selected by the user 215 to display a first set semantically similar sentences 630 extracted from the first document 622 and having been used to determine a semantic similarity between the input document 610 and the first document 622, as well as a first document set of semantically similar keywords 640 extracted from the first document 622 having been used to determine a semantic similarity between the input document 610 and the first document 622. Thus, the user 215 may appreciate that the first document 622 is similar to the input document 610 in part because it comprises the first set semantically similar sentences 630 and the set of semantically similar keywords 640, which relate to the input document 610 in terms of their meaning, even though they may comprise different sentences and words.

The second interactive semantic search interface 600 further comprises a second set of semantically similar keywords 650, where a first keyword 652 has been selected by the user 215 to display a second set of semantically similar documents 660 having been used to determine a semantic similarity between the input document 610 and the first keyword 652. Each document of the second set of semantically similar documents 660 includes the first keyword 652.

It will be appreciated the second set of semantically similar documents 660 and the first set of semantically similar documents 620 may include different documents.

Figure 7:
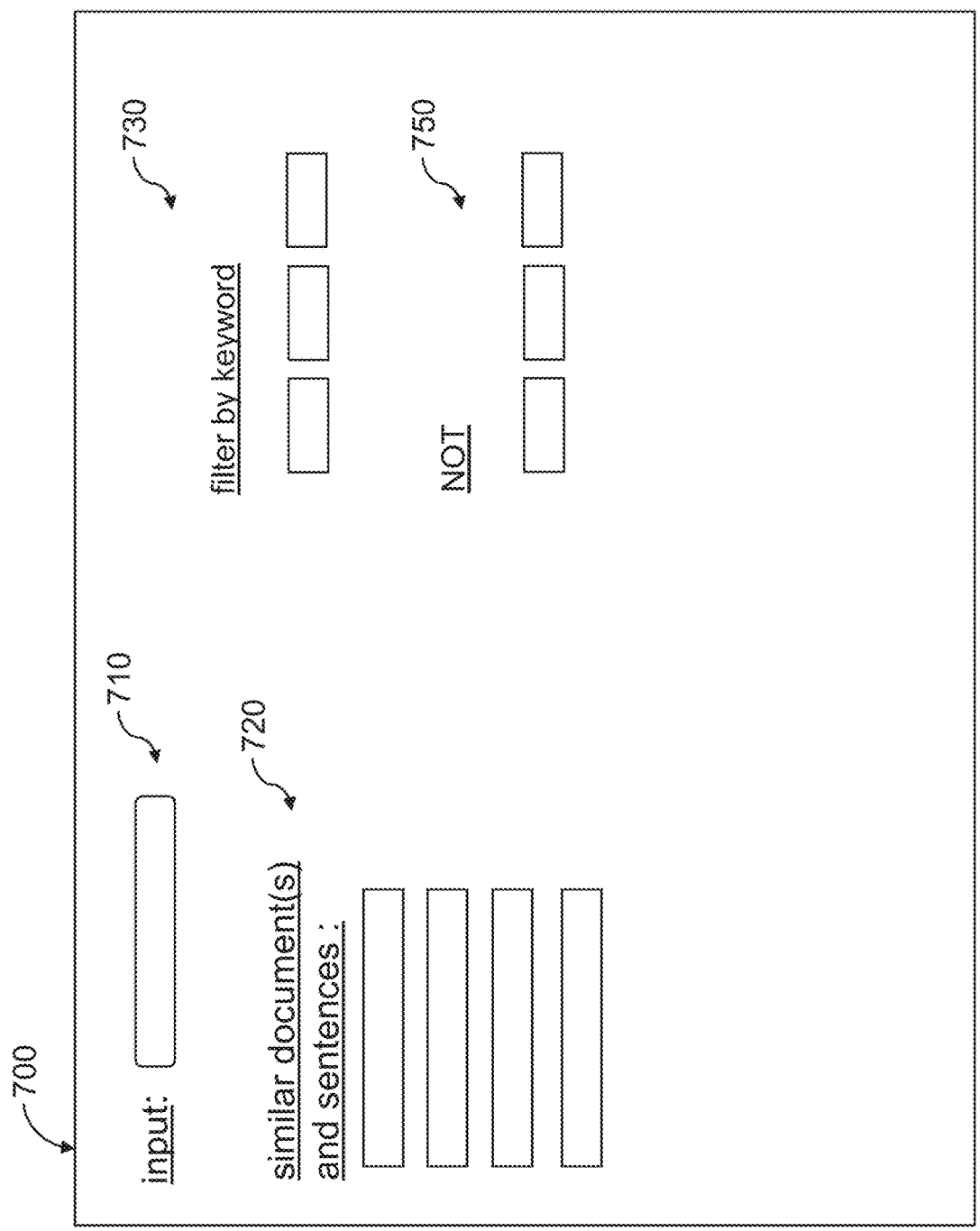
FIG. 7 depicts a schematic diagram of a third semantic search interface in accordance with one or more non-limiting embodiments of the present technology.

FIG. 7 shows a third interactive semantic search interface 700 with an input sentence 710 as the input text object. The third interactive semantic search interface 700 comprises a set of semantically similar documents and sentences 720. It will be appreciated that in this non-limiting example, the set of semantically similar documents are displayed together with semantically similar sentences contained therein.

The third interactive semantic search interface 700 comprises a semantic keyword filtering suggestions 730, which enables the user 215 to filter displayed results by specific keywords of the semantic keyword filtering suggestions 730. The third interactive semantic search interface 700 further comprises a Boolean filtering operator NO 750 to exclude one or more documents, paragraphs, sentences and keywords from results displayed on the third interactive semantic search interface 700.

Figure 8:
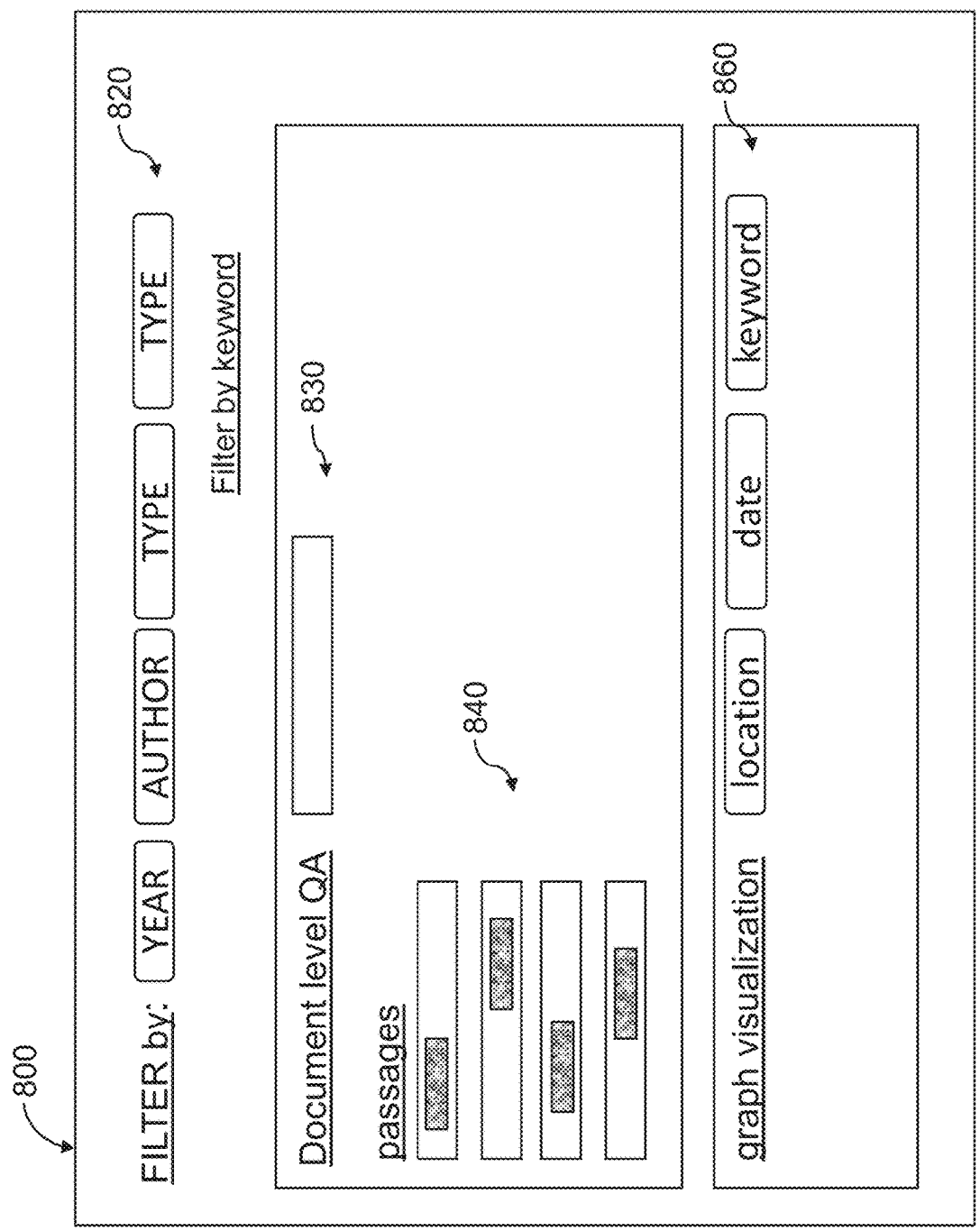
FIG. 8 depicts a schematic diagram of a fourth semantic search interface in accordance with one or more non-limiting embodiments of the present technology.

FIG. 8 shows a fourth interactive semantic search interface 800 comprising filtering suggestions 820, a document level question answering interface 830 which comprises visual indicators in the form of highlighted passages 840 in respective documents having been determined to be semantically similar to an input text object. The highlighted passages may be for example words, sentences and paragraphs.

The fourth interactive semantic search interface 800 further comprises a graph visualization interface 860 which enables the user 215 to display location graphs, date graphs keyword graphs and the like.

Figure 9:
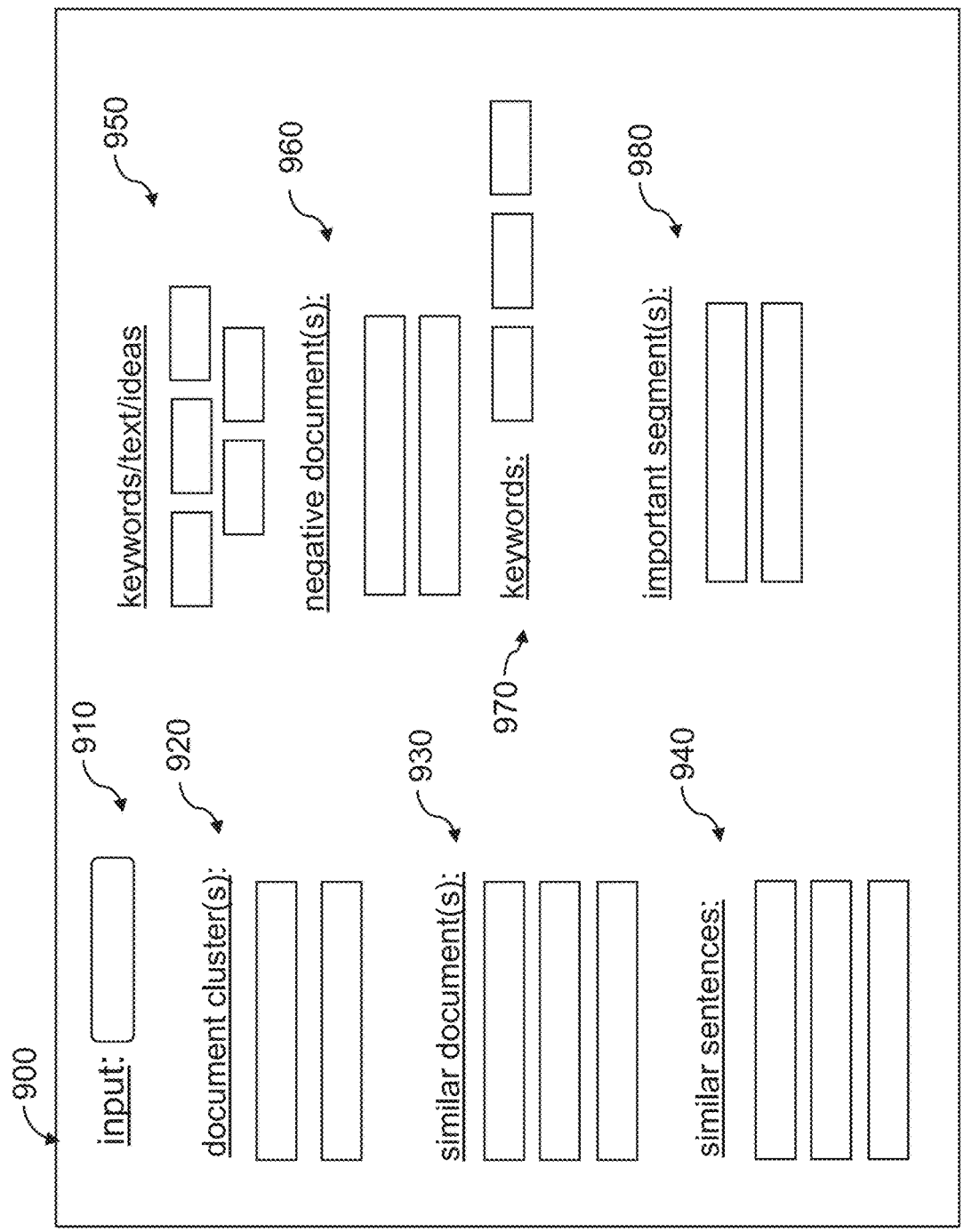
FIG. 9 depicts a schematic diagram of a fifth semantic search interface in accordance with one or more non-limiting embodiments of the present technology

FIG. 9 shows a fifth interactive semantic search interface 900 with an input set of documents 910 or input document cluster 910 as the input text object. The fifth interactive semantic search interface 900 comprises a set of semantically similar documents clusters 920 comprising one or more documents clusters having been determined to be semantically similar to the input document cluster 910, as well as a set of semantically similar documents 930 and a set of semantically similar sentences 940. It will be appreciated that the set of semantically similar documents 930 and the set of semantically similar sentences 940 may not be included in the set of semantically similar documents clusters 920.

The fifth search interface 900 comprises a set of semantically similar keywords 950, negative documents 960 and negative document keywords 970 having a lower level of semantic similarity with the input set of documents 910, and a set of important segments 980 comprising paragraphs, sentences and keywords having been determined to be semantically similar to the input document cluster 910. The fifth search interface 900 enables visualization of the input document cluster 910 on a graph and display its components.

Having described the electronic device 100, the communication system 200, components of the semantic search system 300, the semantic representation generation and comparison procedure 400, and non-limiting examples of interactive semantic search interfaces 500, 600, 700, 800, 900, a method for providing an interactive semantic search interface in response to a search request will now be described with reference to FIG. 10.

Method Description

FIG. 10 depicts a flowchart of a method 1000 of providing an interactive semantic search interface 225 comprising a set of semantically similar text objects in response to a search request, the method 1000 being executable in accordance with one or more non-limiting embodiments of the present technology.

In one or more embodiments, the training server 230 comprises a processing device such as the processor 110 and/or the GPU 111 operatively connected to a non-transitory computer readable storage medium such as the solid-state drive 120 and/or the random-access memory 130 storing computer-readable instructions. The processor 110, upon executing the computer-readable instructions, is configured to or operable to execute the method 1000.

The training server 230 has access to the set of ML models 250 comprising the set of semantic representation ML models 260 and the set of semantic comparison ML models 270.

The method 1000 begins at processing step 1002.

At processing step 1002, the processing device receives a search request, the search request comprising an indication of a text object comprising one or more of a document 410, a paragraph 412, a sentence 414, and a word 416.

The processing device may receive the indication of the search request from the client device 210 over the communications network 280.

At processing step 1004, the processing device receives a semantic representation of the text object included in the search request. In one or more embodiments, the processing device uses the set of semantic representation ML models 260 to generate the semantic representation of the search request. The semantic representation is indicative of semantic features of the text object in the search request.

In one or more embodiments, for a search request including a given document 410, the processing devices generates, for the given document 410, a respective document representation 430. The respective document representation 430 is indicative of semantic features of the text content of the document 410 and thus captures at least a portion of its meaning.

In one or more embodiments, for a search request including a given paragraph 412, the processing device generates, for the given paragraph 412, a respective paragraph representation 432. The respective paragraph representation 432 is indicative of a semantic features of the text content of the paragraph and captures at least a portion of its meaning.

In one or more embodiments, for a search request including a given sentence 414, the processing device generates, for a given sentence 414, a respective sentence representation 434. The respective sentence representation 434 is indicative of semantic features of the text content of the given sentence 414 and thus captures at least a portion of its meaning.

In one or more embodiments, for a search request including a given word 416, the processing device generates, for the given word 416, a respective word representation 436. The respective word representation is indicative of semantic features of the given word 416 and captures at least a portion of its meaning.

In one or more other embodiments, the semantic representation of the search request may have been previously generated and may be received from the database 240.

At processing step 1006, the processing device receives, from the database 240, a set of semantically similar text objects. In one or more embodiments, processing step 1006 comprises processing steps 1008 and processing step 1010.

At processing step 1008, the processing device uses at least one of the set of semantic comparison ML models 270, to compare the semantic representation of the search request with each of a plurality of document semantic representations from the database 240 to obtain a respective semantic similarity scores, each document representation being associated with a respective document in the database 240.

In one or more embodiments, the processing device retrieves a set of potentially relevant or potentially semantically similar text objects from the plurality of text objects 242 stored in the database 240. The set of potentially similar text objects includes at least a portion of the plurality of text objects 242 stored in the database 240. It is contemplated that in some embodiments, the set of potentially similar text objects includes all of the plurality of text objects 242 stored in the database 240. The processing device compares the respective semantic representations the each of the set of potentially semantically similar text objects with the semantic representation of the search request to obtain respective semantic similarity scores.

At processing step 1010, the processing device selects, based on the respective semantic similarity scores, the set of semantically similar documents from the plurality of documents stored in the database 240.

In one or more embodiments, the processing device selects the set of semantically similar documents from the set of potentially semantically similar text objects based on a threshold.

In one or more embodiments, the threshold may be determined prior to the selection of the set of semantically similar documents. It will be appreciated that the threshold may be dynamic and determined based on the number of similar documents and the respective semantic similarity scores.

In one or more other embodiments, the set of semantically similar documents may comprise a predetermined number of documents having a highest similarity score selected from the set of potentially semantically similar text objects.

At processing step 1012, the processing device determines, by using at least one of the set of semantic comparison ML models 270, for each of the set of semantically similar documents: a respective set of similar paragraphs, a respective set of similar sentences, and a respective set of similar words.

In some embodiments, the respective set of similar paragraphs, the respective set of similar sentences, and the respective set of similar words may be extracted from each document in the set of semantically similar documents. Additionally or alternatively, the respective set of similar paragraphs, the respective set of similar sentences, and the respective set of similar words may be text objects that are semantically similar to the each of the set of semantically similar documents but may not have been necessarily extracted from the set of semantically similar documents. For example, the database 240 may store semantic similarities between different types of text objects and each of the set of semantically similar documents.

In one or more embodiments, the processing device may use the set of semantic representation ML models 260 to generate each type of semantic representation and the set of semantic comparison ML models 270 to determine a similarity score between each type of representation and the semantic representation of the search request.

It will be appreciated that processing step 1012 may be executed as part of processing steps 1008 and 1010.

At processing step 1014, the processing device generates the interactive semantic search interface 225 comprising the set of semantically similar documents, which is transmitted for display on a display interface such as a touchscreen 190 of the client device 210.

At processing step 1016, the processing device receives, from the client device 210, a selection of a given document of the set of semantically similar documents. The selection may be an explicit user interaction (i.e. a click or touch) or an implicit user interaction (i.e. dwell time above a threshold) from the client device 210. It will be appreciated that in some embodiments, processing step 1012 may be executed in response to processing step 1016.

At processing step 1018, the processing device transmits for display on the interactive semantic search interface 225, to the client device 210, the respective set of similar paragraphs, the respective set of similar sentences, and the respective set of similar words associated with the given selected document.

In one or more embodiments, the processing device may provide a visual indicator with each of the respective set of similar paragraphs, the respective set of similar sentences, and the respective set of similar words associated with the given selected document. The visual indicator enables the user to appreciate why the given document is considered to be similar to the search request and provides a potential explanation for the similarity which may be due to the presence of the respective set of similar paragraphs, the respective set of similar sentences, and the respective set of similar words. The visual indicator may for example include an emphasized text object component of the given selected document, which have a "high" contribution in the semantic similarity between the given document and the search request.

It will be appreciated that additional information such as similarity scores and metadata may be provided together with the respective set of similar paragraphs, the respective set of similar sentences, and the respective set of similar words associated with the given selected document.

The method 1000 then ends.

While the method 1000 has been described with respect to a set of semantically similar documents which are provided in response to a search request including any type of text objects, it should be understood that any type of semantically similar text objects such as paragraphs, sentences and words including combinations thereof may be provided in response to a search request.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for generating an interactive search interface in response to a search request, the method being executed by a processor, the processor being connected to a database and a client device, the processor having access to at least one machine learning (ML) model having been trained to generate and compare semantic representations of text objects, the method comprising:

receiving, from the client device, the search request, the search request comprising an indication of a text object, the text object comprising one of: a word, a sentence, a paragraph, and a document;

generating, based on the indication of the text object, a semantic representation of the search request;

receiving, from the database, a set of semantically similar documents, said receiving the set of semantically similar documents comprising:

comparing, using the at least one ML model, the semantic representation of the search request with each of a plurality of document representations to obtain a plurality of semantic similarity scores, each semantic similarity score being indicative of a semantic similarity between the search request and a respective document of a plurality of documents in the database; and selecting, based on the plurality of semantic similarity scores, the set of semantically similar documents from the plurality of documents;

determining, using the at least one ML model, for each of the set of semantically similar documents,
   a respective set of similar paragraphs based on associated paragraph representations thereof,
   a respective set of similar sentences based on associated sentence representations thereof, and
   a respective set of similar words based on associated word representations thereof;

generating, for display on a display interface of the client device, the interactive search interface comprising the set of semantically similar documents;

receiving, from the client device, a selection of a given document of the set of semantically similar documents; and generating, for display on the interactive search interface at the client device, an indication of each of the respective set of similar paragraphs, the respective set of similar sentences, and the respective set of similar words associated with the given document.

2. The method of claim 1, wherein said generating the interactive search interface comprising the set of semantically similar documents comprises:
   generating a respective detailed view for each of the set of semantically similar documents, the detailed view comprising at least a portion of each of: the respective set of similar paragraphs, the respective set of similar sentences, and the respective set of similar words.

3. The method of claim 2, wherein said generating for display on the interactive search interface, the indication of each of the given document, the respective set of similar paragraphs, the respective set of similar sentences, and the respective set of similar words associated with the given document comprises:
   generating, on the interactive search interface, a visual indication of each of the respective set of similar paragraphs, the respective set of similar sentences, and the respective set of similar words associated with the given document.

4. The method of claim 1, wherein each document is associated with respective metadata, and wherein said comparing comprises comparing the respective metadata with the search request.

5. The method of claim 1, wherein the database comprises, for each of the set of documents:
   the associated paragraph representations, the associated sentence representations, and the associated word representations.

6. The method of claim 1, further comprising prior to said determining, using the at least one ML model, for each of the set of semantically similar documents, the respective set of similar paragraphs, the respective set of similar sentences, and the respective set of similar words:
   generating, for each document of the set of semantically similar documents, the respective paragraph presentations, the respective sentence representations and the respective word representations; and
   comparing, each document representation of the set of semantically similar documents with each of the respective paragraph presentations, the respective sentence representations and the respective word representations.

7. The method of claim 1, wherein said determining, using the at least one ML model for each of the set of semantically similar documents, the respective set of similar paragraphs, the respective set of similar sentences, and the respective set of similar words is performed during said comparing the semantic representation of the search request with the plurality of document representations.

8. The method of claim 1, wherein
   said determining, using the at least one ML model, based on the semantic representation of the search request, for each of the set of documents, the respective set of similar paragraphs, the respective set of similar sentences, and the respective set of similar words comprises:
      comparing the semantic representation of the search request with each of the associated word representation in the given document to obtain a respective word semantic similarity score;
      comparing the semantic representation of the search request with each of the associated sentence representation in the given document to obtain a respective sentence semantic similarity score;
      comparing the semantic representation of the search request with each of the associated paragraph representation in the given document to obtain a respective paragraph semantic similarity score; and
   wherein
   said determining the respective set of similar paragraphs, the respective set of similar sentences, and the respective set of similar words is based on the respective paragraph semantic similarity score, the respective sentence semantic similarity score and the respective word semantic similarity score.

9. The method of claim 1, wherein said selecting, based on the respective similarity scores, the set of semantically similar documents from the plurality of documents is based on the respective semantic similarity scores being above a threshold.

10. The method of claim 9, further comprising prior to said selecting, based on the respective similarity scores, the set of semantically similar documents from the plurality of documents:
   determining, based on a number of the plurality of documents and the respective semantic similarity scores, the threshold.

11. A system for generating an interactive search interface in response to a search request, the system comprising:
   a processor; and
   a non-transitory storage medium operatively connected to the processor, the non-transitory storage medium comprising instructions,
   the processor having access to at least one machine learning (ML) model having been trained to generate and compare semantic representations of text objects, the processor being operatively connected to a client device,
   the processor, upon executing the instructions, being configured for:
      receiving, from the client device, the search request, the search request comprising an indication of a text object, the text object comprising one of: a word, a sentence, a paragraph, and a document;
      generating, based on the indication of the text object, a semantic representation of the search request;
      receiving, from the non-transitory storage medium, a set of semantically similar documents, said receiving the set of semantically similar documents comprising:

comparing, using the at least one ML model, the semantic representation of the search request with each of a plurality of document representations to obtain a plurality of semantic similarity scores, each semantic similarity score being indicative of a semantic similarity between the search request and a respective document of a plurality of documents in the non-transitory storage medium; and selecting, based on the plurality of semantic similarity scores, the set of semantically similar documents from the plurality of documents;

determining, using the at least one ML model, for each of the set of semantically similar documents,
- a respective set of similar paragraphs based on associated paragraph representations thereof,
- a respective set of similar sentences based on associated sentence representations thereof, and
- a respective set of similar words based on associated word representations thereof;

generating, for display on a display interface of the client device, the interactive search interface comprising the set of semantically similar documents;

receiving, from the client device, a selection of a given document of the set of semantically similar documents; and generating, for display on the interactive search interface of the display interface of the client device, an indication of each of the respective set of similar paragraphs, the respective set of similar sentences, and the respective set of similar words associated with the given document.

12. The system of claim 11, wherein said generating the interactive search interface comprising the set of semantically similar documents comprises:
generating a respective detailed view for each of the set of semantically similar documents, the detailed view comprising at least a portion of each of: the respective set of similar paragraphs, the respective set of similar sentences, and the respective set of similar words.

13. The system of claim 12, wherein said generating for display on the interactive search interface, the indication of each of the given document, the respective set of similar paragraphs, the respective set of similar sentences, and the respective set of similar words associated with the given document comprises:
generating, on the interactive search interface, a visual indication of each of the respective set of similar paragraphs, the respective set of similar sentences, and the respective set of similar words associated with the given document.

14. The system of claim 11, wherein each document is associated with respective metadata, and wherein said comparing comprises comparing the respective metadata with the search request.

15. The system of claim 11, wherein the non-transitory storage medium stores for each of the set of documents:
the associated paragraph representations, the associated sentence representations, and the associated word representations.

16. The system of claim 11, wherein the processor is further configured for, prior to said determining, using the at least one ML model, for each of the set of semantically similar documents, the respective set of similar paragraphs, the respective set of similar sentences, and the respective set of similar words:
generating, for each document of the set of semantically similar documents, the respective paragraph presentations, the respective sentence representations and the respective word representations; and
comparing, each document representation of the set of semantically similar documents with each of the respective paragraph presentations, the respective sentence representations and the respective word representations.

17. The system of claim 11, wherein said determining, using the at least one ML model for each of the set of semantically similar documents, the respective set of similar paragraphs, the respective set of similar sentences, and the respective set of similar words is performed during said comparing the semantic representation of the search request with the plurality of document representations.

18. The system of claim 11, wherein
said determining, using the at least one ML model, based on the semantic representation of the search request, for each of the set of documents, the respective set of similar paragraphs, the respective set of similar sentences, and the respective set of similar words comprises:
comparing the semantic representation of the search request with each of the associated word representation in the given document to obtain a respective word semantic similarity score;
comparing the semantic representation of the search request with each of the associated sentence representation in the given document to obtain a respective sentence semantic similarity score;
comparing the semantic representation of the search request with each of the associated paragraph representation in the given document to obtain a respective paragraph semantic similarity score; and wherein
said determining the respective set of similar paragraphs, the respective set of similar sentences, and the respective set of similar words is based on the respective paragraph semantic similarity score, the respective sentence semantic similarity score and the respective word semantic similarity score.

19. The system of claim 11, wherein said selecting, based on the respective similarity scores, the set of semantically similar documents from the plurality of documents is based on the respective semantic similarity scores being above a threshold.

20. The system of claim 19, wherein the processor is further configured for, prior to said selecting, based on the respective similarity scores, the set of semantically similar documents from the plurality of documents:
determining, based on a number of the plurality of documents and the respective semantic similarity scores, the threshold.

* * * * *